United States Patent
Kerry et al.

(10) Patent No.: US 6,218,983 B1
(45) Date of Patent: Apr. 17, 2001

(54) APPARATUS FOR AND METHOD OF DETERMINING POSITIONAL INFORMATION FOR AN OBJECT

(75) Inventors: Nicholas J. Kerry, Cambridge; Per A. V. Utsi, Ely; Miles E. G. Upton; Justin D. J. Penfold, both of Cambridge; Gordon K. A. Oswald; Alan T. Richardson, both of Cambridgeshire, all of (GB)

(73) Assignee: Cambridge Consultants Limited, Cambridge (GB)

( * ) Notice: Subject to any disclaimer, the term of this patent is extended or adjusted under 35 U.S.C. 154(b) by 0 days.

(21) Appl. No.: 09/055,288

(22) Filed: Apr. 6, 1998

Related U.S. Application Data

(63) Continuation of application No. PCT/GB96/02448, filed on Oct. 7, 1996.

(30) Foreign Application Priority Data

Oct. 6, 1995 (GB) .................................................. 9520487

(51) Int. Cl.⁷ ..................................................... G01S 13/00
(52) U.S. Cl. ............................................................. 342/149
(58) Field of Search .................................... 342/149, 126, 342/133, 119, 157, 154; 367/125, 127; 701/300

(56) References Cited

U.S. PATENT DOCUMENTS

| | | | |
|---|---|---|---|
| 3,996,590 | * 12/1976 | Hammack | 342/126 |
| 4,057,708 | * 11/1977 | Greeley et al. | 342/119 |
| 5,140,330 | 8/1992 | Le Garrec et al. | 342/146 |
| 5,510,800 | 4/1996 | McEwan | 342/387 |

FOREIGN PATENT DOCUMENTS

| | | |
|---|---|---|
| 0477094 A1 | 3/1992 | (EP) . |
| WO 90/13048 | 11/1990 | (WO) . |
| WO 93/24847 | 12/1993 | (WO) . |
| WO 94/24579 | 10/1994 | (WO) . |
| WO 94/24580 | 10/1994 | (WO) . |

* cited by examiner

Primary Examiner—Daniel T. Pihulic
(74) Attorney, Agent, or Firm—Nixon & Vanderhye P.C.

(57) ABSTRACT

Apparatus for determining positional information for an object transmits a probe signal towards the object. The probe signal as returned by the object is received at a plurality of spaced apart locations. The relative timing of the returned probe signals as received at the plurality of locations is detected, whereby positional information for the object can be determined. A number of realizations of the invention are disclosed.

60 Claims, 14 Drawing Sheets

APPARATUS FOR AND METHOD OF DETERMINING POSITIONAL INFORMATION FOR AN OBJECT

This is a continuation of PCT application No. PCT/GB96/02448, filed Oct. 7, 1996.

BACKGROUND OF THE INVENTION

1. Field of the Invention

The present invention relates to apparatus for and a method of determining positional information for an object. The positional information might typically be angular orientation or attitude with respect to or range from a given datum.

The invention has application in a number of fields including but not limited to automotive collision avoidance, intruder detection, and sensors in robotics for supporting motion in a complex and changing environment. One particular use for the invention is in a scoring system of the type which can provide a score for the proximity of approach of an object such as a small aircraft or intruder to a specified location such as a target aircraft or other detection location.

The invention is described in detail later with reference to an electromagnetic sensor apparatus, and particularly with reference to short range electromagnetic sensing using short pulse, impulse systems (such as with pulses up to a few nanoseconds in duration). However, it could also function successfully using, for example, infra-red or acoustic techniques. A specific example of the present invention, which will be used to describe its preferred features, is that of a precision terminal trajectory scoring radar system.

2. Related Art

Electromagnetic sensors (impulse radars) employing short pulse transmissions have been used previously for evaluating the trajectories of various targets. In such applications, the requirement is often to measure the trajectory of the target in a region about the sensor, as well as target parameters such as the length or its orientation. For instance, an electromagnetic sensing apparatus is known from International Patent Application No. PCT/GB90/00602, which names Cambridge Consultants Ltd. as patent applicant now U.S. Pat. No. 5,181,039 issued Jan. 19, 1993 and whose disclosure is incorporated by reference.

FIG. 1 shows the configuration of this prior art apparatus, with an aircraft 10 notionally cocooned in a set of range gates 12. 16 range gates in total are shown. A target approaching the object (aircraft), as represented by the linear track 14 superposed on the range gates, will cross these range gates in a unique sequence determined by its relative trajectory. As can be seen from the linear track of the target, the different range gates are crossed at different times and so the solution for the full track is derived by assuming a particular form such as a straight line for the track.

FIG. 2 is a simplified schematic representation of this prior art apparatus showing just 2 of the 8 receive antennas typically provided. In brief, under the timing of timer 20 transmitter 22 transmits probe pulses via transmit antenna 14. The return signals are received via first and second receive antennas 26 and 28 and first and second RF amplifiers and filters 30 and 32. Under the timing of the timer 20 first and second sets of pulse generators PG1 to PG4 and PG5 to PG8 generate detection timing signals at varying delays with respect to the time of transmission of the probe pulse to trigger detection of the received signal at those delays by first and second sets of samplers S1 to S4 and S5 to S8. The various delays correspond to the various range gates 12 notionally surrounding the aircraft. Finally, the sampled signal is passed through first and second sets of audio frequency processing units AF1 to AF4 and AF5 to AF8, through first and second sets of data channels DC1 to DC4 and DC5 to DC8, to data processor 34 and data transmission means 36, and thence finally to a ground station 38 or the like.

In the present context, particular points of interest are that each range gate of the apparatus requires its own sampler, pulse generator and audio frequency (AF) processing unit and that the existence of independent pulse generators means that the differential delay between corresponding range gates with respect to different antennas is uncontrolled.

FIG. 3 shows a timing diagram for the prior art apparatus, for the sake of simplicity with just a single receiver and a single transmitter. Four range gates are formed using the four range gate samplers, at delays of 60, 122.5, 185 and 247.5 ns from the relevant probe pulse. In theory each sampler might be considered to yield not one but a sequence of range gates from each of the previous probe pulses, each spaced apart by 500 ns (equivalent to 76 m). However, in practice only a single range gate is formed because the signal from a target decreases as the fourth power of range and so, quite deliberately, any reflection from previous probe pulses is arranged to be below the noise floor of the apparatus and is hence undetectable by the samplers. Thus although the first sampler theoretically could give range gates at approximately 9, 85 and 161 m and so on, the signal at 85 m will be 39 dB below that from 9 m and so it will not be detectible; likewise the signals at 161 m and beyond will also be undetectable. Hence every sampled return signal corresponds unambiguously to one range gate.

Another feature of the prior art apparatus is that the timing module is fairly complex because each sampler for a receiver is driven with an independent clock which has to be set to the required delay between range gates.

A refinement of the prior art apparatus is known from Internal Patent Application No. PCT/GB94/00738, which also names Cambridge Consultants Ltd. as patent applicant and whose disclosure is also incorporated by reference. In this case, it was recognized that to achieve higher accuracy on smaller vehicles than that of the original apparatus would require very accurate knowledge of the location of the range gate and hence a real time autocalibration system was employed. This system while improving the performance had the disadvantages of requiring yet more circuitry for the autocalibration receiving means and timing generator, and of increasing the bandwidth of the signals required to evaluate target position.

In both of these prior art apparatuses, the three dimensional vector position of the target is evaluated by making absolute range measurements to specific features of the target to be tracked from receivers distributed around the vehicle on which the sensor is mounted. A key feature of the apparatuses is that the range measurements with respect to the different receivers are not simultaneous and so deriving the precise trajectory of the target requires fitting an assumed model trajectory (such as a straight line or a constant curvature curve) to these non-simultaneous measurements. Hence they have the disadvantage that until the full three dimensional trajectory of the target as a function of time has been computed, no representation of the three dimensional position of the target at a particular time is available; hence the processing is not real time. Also, there is critical reliance on the particular assumed model trajectory.

Yet a further feature of these two known apparatuses is that the accuracy of position measurements deteriorates for smaller vehicles carrying the apparatus, to the point where they become unusable for very small vehicles. This is because the known apparatuses measure the trajectory of the target with a precision determined by the minimum baseline of the antennas as installed, and thus the smaller the vehicle on which the system is mounted the less accurate the position measurement. This problem was addressed in PCT/GB94/00738 by incorporating an autocalibration system to measure in real time the absolute locations of the range gates with very high precision without affecting the normal operation of the sensor. This too had the practical limitations that the accuracy was limited if the antenna separation was less than 1 m and the extra hardware required was expensive.

SUMMARY OF THE INVENTION

According to a first aspect of the present invention (the "differential delay aspect"), there is provided apparatus for determining positional information for an object, comprising:

means for transmitting a probe signal towards the object;

means for receiving, at a plurality of spaced apart locations, the probe signal as returned by the object; and detecting means, coupled to the receiving means, for detecting the relative timing of the returned probe signals as received at the plurality of locations;

whereby the positional information for the object can be determined from said relative timing.

By detecting the relative timing (also termed "differential delay") of the returned probe signals as received at the plurality of locations, the positional information can be determined in real time, for example through a process of triangulation. Also, accuracy can be preserved or even enhanced, especially when the apparatus is mounted on a small object. With other improvements taught herein, it is possible to control the differential delay to within roughly 5 ps (0.7 mm).

Hence the inventive step in this aspect recognizes firstly that for closely spaced antennas the backscattered waveform from the target object would be very similar at the same range. This occurs because the relative geometry of the target and the (for example) two receive antennas would be equivalent so long as the range gate range was large in comparison to the antenna separation. Moreover, for a given separation between the range gates the distance a target would travel between the range gates was a well defined function of the angle between the target position and the line going to the two receivers. Therefore, with multiple non-coplanar receivers, a full three dimensional position could be triangulated. Hence, if the range gates with respect to different antennas had a well-defined differential range, the time delay between arrival at the two similar range gates with respect to different antennas could be very highly accurately measured simply by finding the peaks in the correlation of the two signatures. In fact, it turns out that the accuracy of differential range measurement can be several times better than the accuracy of absolute range measurement and since the derived position error increases depending on the range error divided by the antenna separation, the position error can be improved by switching to a differential range based technique.

Preferably, the apparatus includes means for determining the positional information for the object from said relative timing. Suitably, the determining means is adapted to determine the angular position of the object, since this is particularly easily determined by the technique of the present invention. However, alternatively or usually additionally other positional information such as absolute or relative range may be determined, as may the velocity of the object. For example, the position of more than one feature of the object may be measured (at more than one range gate) and hence the orientation of the object may be derived from measurements at at least two range gates.

A particular advantage of being able to determine the relative angular position of the object, at a given instant, is that no compensation is required for possible changes in the attitude of the apparatus over time. Such compensation might otherwise need to be provided by a system of gyros or the like.

Preferably, the determining means is adapted to determine the positional information by triangulation. Hence, the present invention may provide a processing sub-system which measures the differential delay between each receiver pair to infer the vector position of the target by triangulation between the results from the different receiver pairs. In three dimensions, triangulation may suitably be carried out either using 3 independent angles and one range measurement or using 4 independent angles.

More preferably, the determining means is adapted to determine a trajectory for the object by triangulating at a plurality of discrete times. By using triangulation in this way, the present invention can determine the trajectory without detailed (or indeed any) prior assumptions being made about the trajectory, and without any knowledge of the motion of the apparatus itself.

Preferably, if the detecting means is adapted to detect the returned signals at a given minimum range from the apparatus, the angle mutually subtended by the locations at that minimum range is less than 10, more preferably less than 5, and even more preferably less than 3 degrees. This can ensure that errors due to variability in back-scatter from the object are minimized so that the invention can operate effectively.

Preferably, the detecting means is adapted to detect the relative timing of the returned signals by cross correlating between them. This has been found to be a particularly efficient way of putting the invention into practice. More preferably, the processing sub-system measures the differential delay between target reflections in different receiver channels at the same range by correlating the output of the receiver channels at the same range and inferring the delay by identifying and precisely timing peaks in the cross-correlation function. Again, more preferably the cross correlation is carried out in the audio frequency range.

There are a number of restraints concerned with the timing of the detection of the returned probe signals. It is important that when detecting the relative timing this is carried out for probe signals which are received as close in time to each other as possible. There are several reasons for this. If the relative timing were detected for signals which are received at greatly different times, firstly the variation in the back-scatter due to the likely motion of the object could render the correlation process difficult or impossible to carry out accurately; this problem could be solved by keeping a library of likely return signals, and further correlating against these, although this may be undesirable. Secondly, the correlation process would require to be carried out over a relatively long time span. This would be computationally expensive.

A third reason is concerned with the length of the probe signal; preferably the probe signal takes the form of a pulse of a given duration, and, if so, the detecting means is preferably adapted to detect the relative timing of returned signals which are received within twice such given duration, more preferably within once or one half said given duration.

Typically, the probe signal pulse has a duration of less than 5 ns, say 1, 2, 3 or 4 ns; preferably therefore the detecting means is adapted to detect the relative timing of returned signals which are received with 3, 2, or 1 ns of each other, or more preferably in fact within 500, 250 or 100 ps of each other. Indeed, most preferably the detecting means is adapted to detect the relative timing of returned probe signals which are received substantially simultaneously. This can be an important feature which can enable real time determination of positional information and can enable triangulation to be carried out successfully.

Another important restraint concerns the relative uncertainty as to when the returned probe signals are received, sine this directly affects the ultimate accuracy of the technique. Regardless of how great the time difference between receiving the signals of interest, preferably, the detecting and receiving means are adapted such that the uncertainty in said relative timing is less than 100, 50, 20, 10 or 5 ps.

Preferably, the receiving means includes means for limiting the power of the probe signal as received. The limiting may be partial or complete; in other words, either attenuation of the signal may occur if the power is too great, or the signal may be switched out altogether whilst it is of excessive power. This is to avoid damage to the receiving means.

Further preferred features of the various integers of the invention are as follows. The transmitting means may comprise a transmitter switched into one or possibly more transmit antennas, in the latter alternative to achieve full volume coverage of the area where the object needs to be tracked.

Preferably, the receiving means comprises at least 4, 5 or 6 receive antennas at respective ones of the spaced apart locations. The relative timing is then suitably detected as between pairs of such antennas. Preferably also, the receive antennas are non-coplanar so that the differential delays are sufficient to define the three dimensional position of the object. More limited 2-D arrangements are of course possible if only 2-D position is desired to be measured (for example, in the case of intruders).

Preferably, the detecting means comprises narrow aperture samplers triggered from the same pulse generator at each discrete value of range used by the apparatus, as well, preferably, as appropriate processing means to detect the said relative timing. Preferably also, the detecting means forms more than one range gate, and preferably again this means derives the position of the object at each of the range gates and infers position between the range gates by interpolation or curve fitting. In this case, suitably a single output channel contains range gates at a multiplicity of delays separated by more than the length of the target. Also, suitably the output channel is generated by adding the output from the sampling means into a common audio frequency processing section. Again, preferably, at least two range gates at any antenna are set up at close and tightly controlled separations so that the normal velocity of the target can be directly measured from the time the target takes to move between them.

In the first aspect, the present invention also provides a method of determining positional information for an object, comprising:

transmitting a probe signal towards the object;
receiving, at a plurality of spaced apart locations, the probe signal as returned by the object; and
detecting the relative timing of the returned probe signals as received at the plurality of locations;
whereby the positional information for the object can be determined from said relative timing.

The method may include the step of determining the positional information for the object from said relative timing.

Preferably in this method aspect, the angular position of the object is determined.

The positional information may be determined by triangulation. A trajectory for the object may be determined by triangulating at a plurality of discrete times.

Preferably, the probe signal takes the form of a pulse of a given duration, and the relative timing is detected of returned signals which are received within twice such given duration, more preferably within once or one half said given duration. Preferably also, the relative timing is detected of returned signals which are received within 3, 2 or 1 ns or 500, 250 or 100 ps of each other. Again, preferably the relative timing is detected of returned probe signals which are received substantially simultaneously. Yet again, preferably the uncertainty in said relative timing is less than 100, 50, 20, 10 or 5 ps.

Again, preferably the returned signals are only detected at given range gates, and the gate separation is greater than 1, preferably greater than 1.2 or 1.5, and more preferably greater than 1.7, times the maximum dimension of the object taken in a direction towards any of said spaced apart locations.

In the first (differential delay) aspect, the present invention also provides an electromagnetic sensor system comprising a transmitter and associated transmit antenna; at last two receive antennas with receiving means configured to measure the returned signal at controlled and nearly equal delays; and a processing sub-system which extracts the differential delay between the time of arrival of a pulse at each of the receivers to infer the angular position of the target.

In a second aspect (the "common pulse generator" aspect, although not limited solely thereto), there is according to the present invention provided apparatus as aforesaid further comprising means for generating a detection timing signal at a delay after a given probe signal transmission time, corresponding to at least one selected range for the object; and wherein the detecting means comprises a plurality of detectors, each one for detecting the returned probe signal as received at a respective one of the locutions in response to a common detection timing signal.

This important aspect is provided independently. Hence, according to the second aspect, there is provided apparatus for determining positional information for an object, comprising:

means for transmitting, at a given transmission time, a probe signal towards the object;
means for generating a detection timing signal at a delay after the transmission time, corresponding to at least one selected range for the object;
means for receiving, at a plurality of spaced apart locations, the probe signal as returned by the object; and
detecting means coupled to the receiving means and comprising a plurality of detectors, each one for detecting the returned probe signal as received at a respective one of the locations in response to a common detecting timing signal;
whereby the positional information for the object can be determined from the outputs of the detectors.

By arranging that the detectors detect the returned signals in response to a common detection timing signal, firstly the necessary timing accuracy can be achieved to facilitate the determining of positional information using the differential delay technique referred to previously; secondly, the apparatus can become less hardware intensive since the detection timing signal generating means need generate fewer different detection timing signals.

Indeed, if, as is preferred, the generating means comprises a pulse generator, a single such generator is advantageously used to generate the common timing signal. Suitably, the transmitting and generating means are timed by a clock, preferably the same clock. Advantageously, the detection timing signal is used to generate one or more range gates.

The present inventive step recognizes that building apparatus with well defined differential delay between range gates is possible by using a new trigger arrangement (the common detection timing signal) for the sampling receivers employed. To then define the trajectory and orientation of the object can be accomplished with apparatus with only two ranges so long as the three dimensional position of the object at each range gate can be derived. Moreover, developments in electronics pursuant to the present invention have enabled this to be done so long as the processing algorithms can handle the more complex data output from the sampler. Such an apparatus also has the advantage of highly rationalizing the electronics required and so decreasing cost.

Preferably, the detecting means comprises a plurality of sets of detectors (preferably no more than two, three or four such sets) and the generating means is adapted to generate a plurality of common detection timing signals, a respective one for each set of detectors. Each common detection timing signal would advantageously be generated by a single pulse generator, and would be used to generate one or more further range gates.

Preferably, no more than two detectors are provided for detecting the returned probe signals as received at any one of the locations. In this way the amount of hardware required can be reduced by comparison with that provided by the known apparatuses.

Preferably, the apparatus includes means for distinguishing from the output of the detectors information concerning different ranges. This may be necessary if the output of a single detector bears information concerning several different ranges, which may be the case if a multiple pulse in flight technique (as later described) is employed. The distinguishing means may be embodied in processing software or hardware, and suitably carries out a process of "de-interleaving" (again as later described).

Preferably, the generating means is adapted to generate different kinds of detection timing signals. The signals may, for example, differ as to polarity. Different signals can be arranged to actuate a different detector, which can allow the use of yet less hardware intensive generating means.

In the second common pulse generator aspect, there is according to the present invention also provided a method as aforesaid further comprising generating a detection timing signal at a delay after a given probe signal transmission time, corresponding to at least one selected range for the object; and providing a plurality of detectors, each one detecting the returned probe signal as received at a respective one of the locations in response to a common detection timing signal.

This method aspect is also provided independently. Hence, according to this aspect the present invention provides a method of determining positional information for an object, comprising:

transmitting, at a given transmission time, a probe signal towards the object;

generating a detection timing signal at a delay after the transmission time, corresponding to at least one selected range for the object;

receiving, at a plurality of spaced apart locations, the probe signal as returned by the object; and providing a plurality of detectors, each one detecting the returned probe signal as received at a respective one of the locations in response to a common detection timing signal;

whereby the positional information for the object can be determined from the outputs of the detectors.

Preferably, in the generating step a pulse generator is provided, a single such generator generating the common timing signal.

Preferably, a plurality of sets of detectors is provided and a plurality of common detection timing signals is generated, a respective one for each set of detectors.

In a third aspect (the "multiple pulse in flight" aspect) of the present invention, in any of the methods as aforesaid, in the transmitting step pulsed probe signals are transmitted at a selected pulse repetition frequency, a measure of the inverse of said frequency defining a pulse repetition frequency path length for the signals; and in the detecting step the path length for the signals greater than which the object cannot be detected defines a maximum detectible path length; the pulse repetition frequency being selected such that the pulse repetition frequency path length is less than the maximum path length.

By selecting the pulse repetition frequency such that the pulse repetition frequency path length is less than the maximum path length, signal to noise ratio and resolution can be improved; also hardware savings can be made since a single detector can generate multiple range gates. However, this does mean that returned signals will not correspond unambiguously to a particular range gate (since there may be multiple pulses in flight), and hence as taught herein various processing enhancements are required to cope with the ambiguity.

This third aspect is also provided independently. Hence according to the present invention there is provided a method of determining positional information for an object, comprising:

transmitting pulsed probe signals towards the object at a selected pulse repetition frequency, a measure of the inverse of said frequency defining a pulse repetition frequency path length for the signals;

receiving the probe signals as returned by the object; and detecting the returned probe signals, the path length for the signals greater than which the object cannot be detected defining a maximum detectible path length;

the pulse repetition frequency being selected such that the pulse repetition frequency path length is less than the maximum path length; and whereby the positional information for the object can be determined from the returned probe signal.

Typically, the maximum path length is twice the range of the furthest of a series of notional range gates around the apparatus. It will be understood that the path lengths referred to would usually be bi-static ranges (to and from the object). The pulse repetition frequency path length is typically defined as the speed of light divided by the pulse repetition frequency.

Advantageously, the path length greater than which the object cannot be detected is defined in terms of a given noise threshold; in other words, the object is defined as not being detectible when a particular return signal is below a given noise threshold. The noise threshold may be set at some factor (say 2, 3 or 5 times) times the ambient noise. If more than one transmit antenna is employed, the pulse repetition frequency would usually be taken as the frequency of all the pulses in combination.

Preferably, the maximum path length is greater than twice, and more preferably greater than three, four or five times, the pulse repetition frequency path length; indeed, within reason the higher it is the better. This feature can enhance the signal to noise improvement.

Preferably, the pulse repetition frequency path length is greater than two times, and more preferably greater than three or even four times, the maximum dimension of the object taken in a direction towards any of said spaced apart locations. This can avoid various features of the object being detected at ambiguous ranges.

The returned signals may be detected at a given sampling frequency. If so, then preferably one of the pulse repetition frequency and the sampling frequency is an integral multiple of the other. In appropriate circumstances range gates can then be formed sequentially rather than simultaneously.

In a first preferred realization of the present invention, the two frequencies (pulse repetition and sampling) are the same. In a second preferred realization the probe signals are transmitted alternately from two transmit antennas at a combined pulse repetition frequency which is the same as the combined sampling frequency of the two detectors which are used per receiver. In a third preferred realization the sampling frequency is twice the pulse repetition frequency. In a fourth preferred realization, multiple pulse in flight techniques are actually not employed, but the outputs of some or all of the detectors are summed to achieve the date rate advantages achievable with the other realizations. In a fifth preferred realization probe signals of different relative amplitude are transmitted. More particularly, the transmitter is pulsed faster than the detector and the amplitude of the probe pulse is modulated pulse-to-pulse both to form the multiple range gates through a sampling element and to limit the dynamic range of the channel. However, in other preferred embodiments the probe signals are all of the same amplitude, and are indeed all preferably identical.

Preferably, the returned signals are detected at a plurality of distinct range gates, using a number of detectors which is less than the number of range gates. Indeed, there may only be one detector per range gate. In other words, the multiple range gates may be generated by pulsing the apparatus faster than the maximum unambiguous range of the apparatus implies (this being a different way of viewing the multiple pulse in flight concept). By using fewer detectors (samplers) than range gates, the component count of the apparatus can be reduced. Also the telemetry bandwidth can be reduced if the resultant data is being transmitted, since more than one gate contributes to only a single data channel.

Analogous method steps to the above described apparatus features are also provided within the scope of the present invention, and vice versa. Also, features of the different aspects of the invention can be applied as appropriate to other aspects.

BRIEF DESCRIPTION OF THE DRAWINGS

Preferred features of the present invention will now be described, purely by way of example, with reference to the accompanying drawings, in which.

In the figures, like features are represented by like reference numerals.

DETAILED DESCRIPTION OF EXEMPLARY EMBODIMENTS

Overall Configuration for the Present Invention

Figure 4:
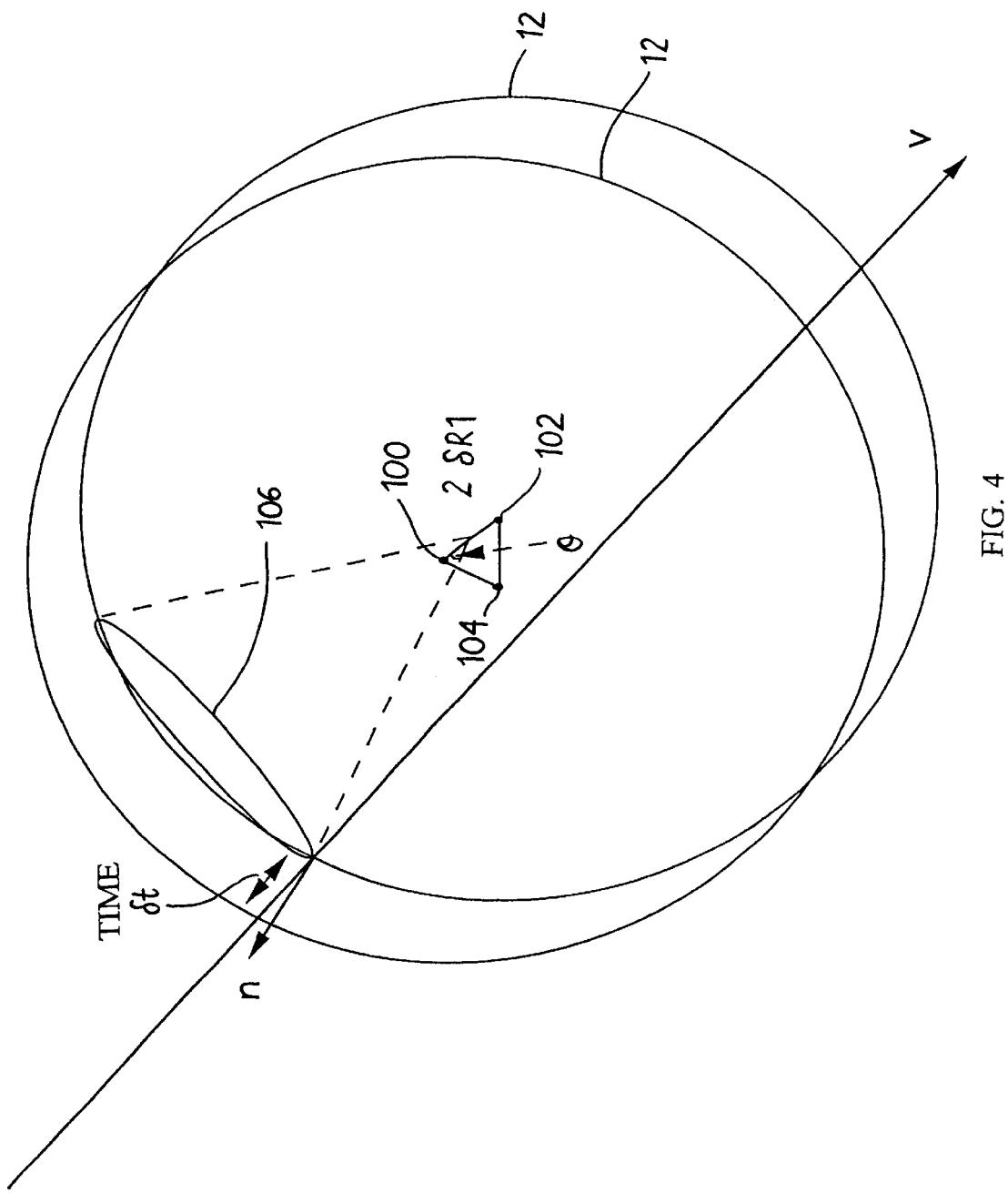
FIG. 4 illustrates the overall configuration for the present invention.

Referring first to FIG. 4, three receivers 100, 102 and 104, are disposed at the vertices of a triangle but this is not fundamental so long as however many receivers are provided are at known locations. For simplicity, FIG. 4 shows just two range gates at the same delay with respect to the two receivers 100 and 102 (one gate per receiver); it should be noted that the range gates are not to scale. As is clear, the angle θ between the position at which the target (possibly a missile) crosses the range gate and the line joining the two receivers is a function of the distance between the range gates, which in turn is directly proportional to the different delay, δt; the distance is a maximum when θ is 0 or 180° and a minimum (zero) when θ is 90 or 270°. In three dimensional terms a given angle θ would be representative of a target placed on a hyperboloid focused at the two receivers.

It is desirable that the two receive antennas are close together relative to the range gate range because the normals to the two range gates at the point the target crosses the range gate will be nearly parallel. In this case, the distance the target flies between the range gates characterizes the position of the target to be on a cone whose vertex is at the midpoint of the two antennas, whose slant length is given by the range gate delay and whose cone semi-angle is hence θ, as denoted in FIG. 4 at 106. The vehicle on which the apparatus is mounted is typically small, and hence the two receive antennas are often inevitably close together. If the vehicle is particularly large, it may be advantageous to place the receive antennas close together rather than at the extremities of the vehicle.

Whilst FIG. 4 shows for simplicity three receivers (suitable in fact for two-dimensional operation), for full three dimensional vector position measurement, at least three non-coplanar receiver pair would be needed, such as could be provided by a minimum of four suitably distributed receivers (different pairs having receivers in common). Thus a minimal configuration offering three dimensional position measurement could employ receive antennas on a tetrahedron (hence providing in fact a total of six possible paired combinations), although it will be appreciated that it is not usually possible to position the receivers precisely like that. Some redundancy is desirable, for instance because (with reference still to FIG. 4) when the angle θ is 90° accuracy is reduced by comparison with when θ is 0°. To measure the position at a sequence of times a sequence of range gates would be employed (in the manner described above in relation to the known electromagnetic sensor apparatus).

The apparatus can employ a separate transmit antenna approximately co-located, for example at the centre of the tetrahedron, or alternatively any of the receive antennas could also be transmit antennas with appropriate switching means to switch the antenna from transmit to receive mode.

Thus in general terms the present invention can operate to determine positional information concerning a target as follows:

(a) Measuring the differential delay δt (see FIG. 4) between the target crossing range gates at the same range for different receivers;

(b) Triangulating between differential delays at a number of receiver pairs to evaluate the (usually three dimensional) vector position; and (c) Joining points measured at different range gates and interpolating to infer the position of the target at any time.

One possible configuration for the present invention is a hybrid between the configuration just described and that described in International Patent Application No. PCT/GB90/00602. Especially on a large vehicle, a compact set of antennas could be provided for putting into effect the differential delay technique, whilst a spaced apart set could exploit a greater baseline to use the know technique to advantage to evaluate information such as attitude information.

Apparatus for the Present Invention

Figure 1:
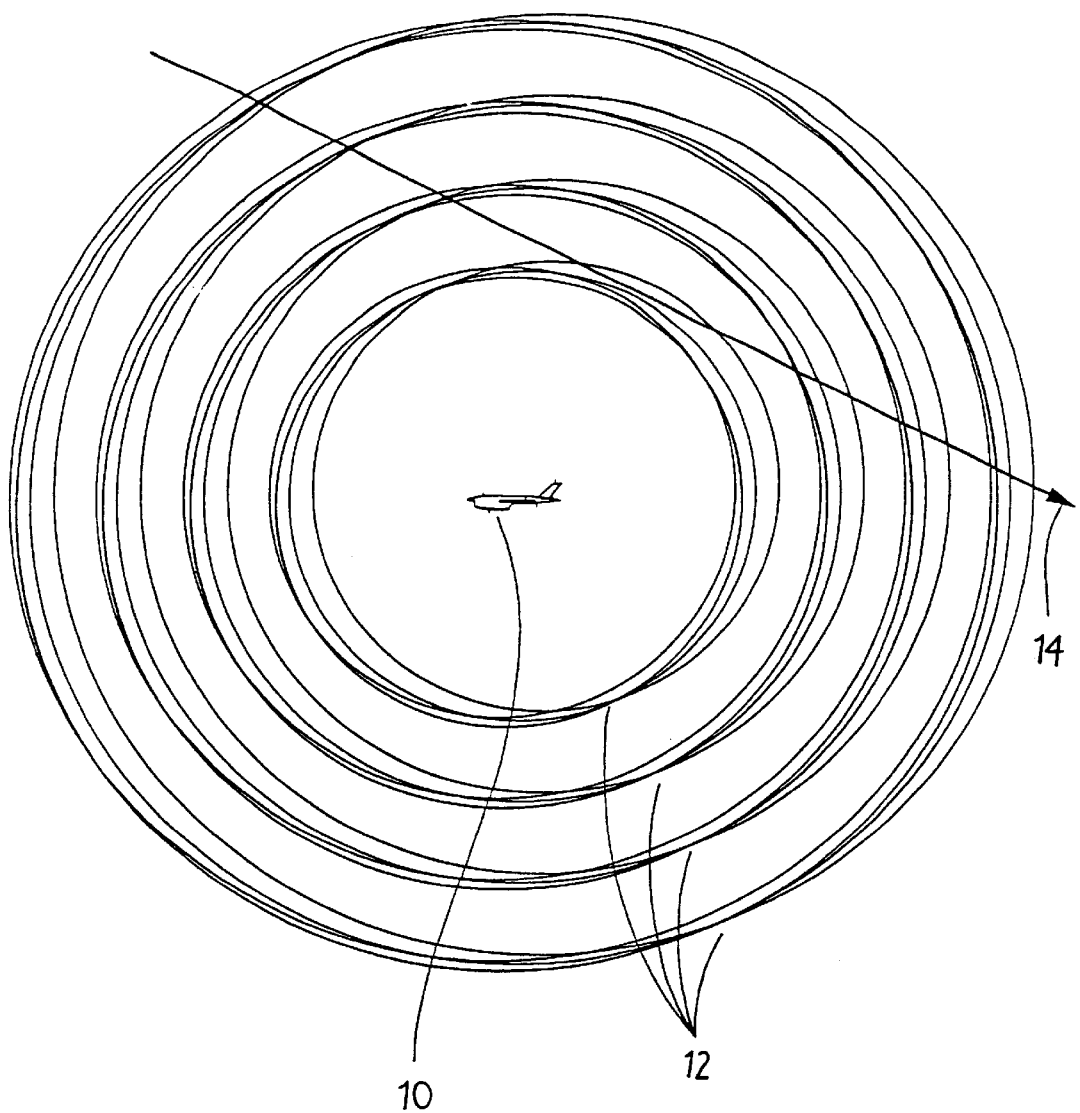
FIG. 1 illustrates the configuration of range gates in a know electromagnetic sensor apparatus.
Figure 2:
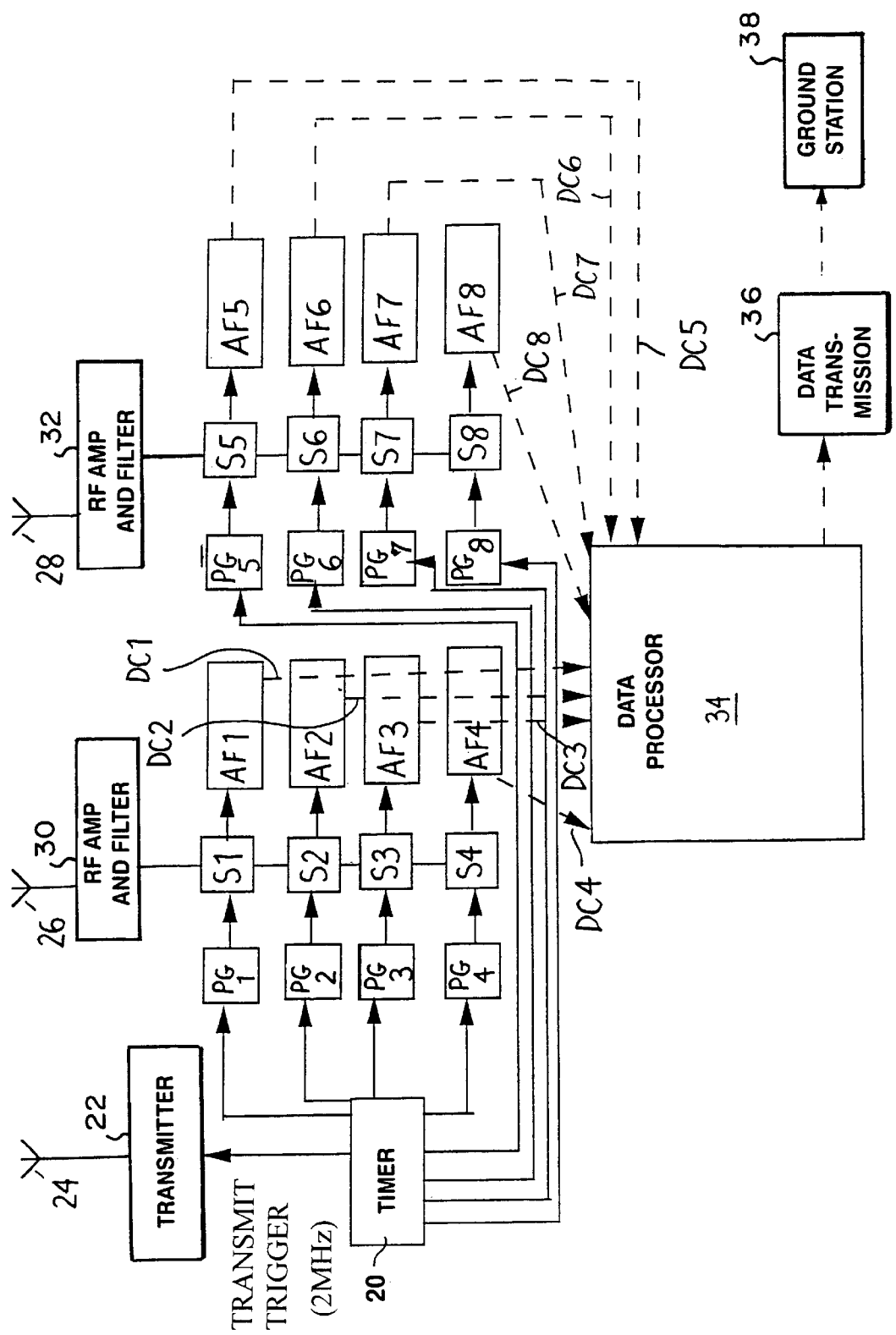
FIG. 2 is a schematic representation of the known apparatus.
Figure 3:
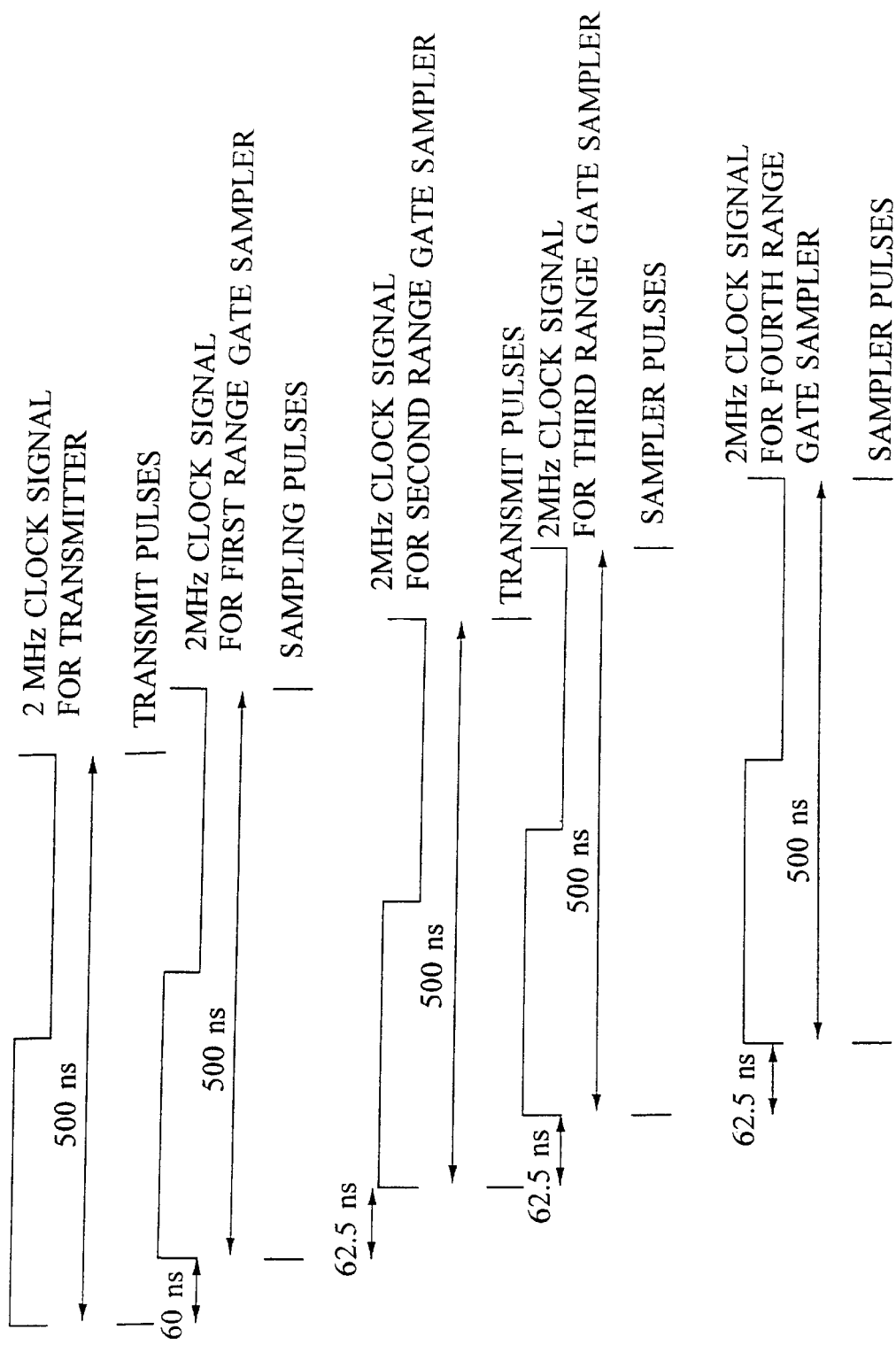
FIG. 3 is a timing diagram for the known apparatus.
Figure 5:
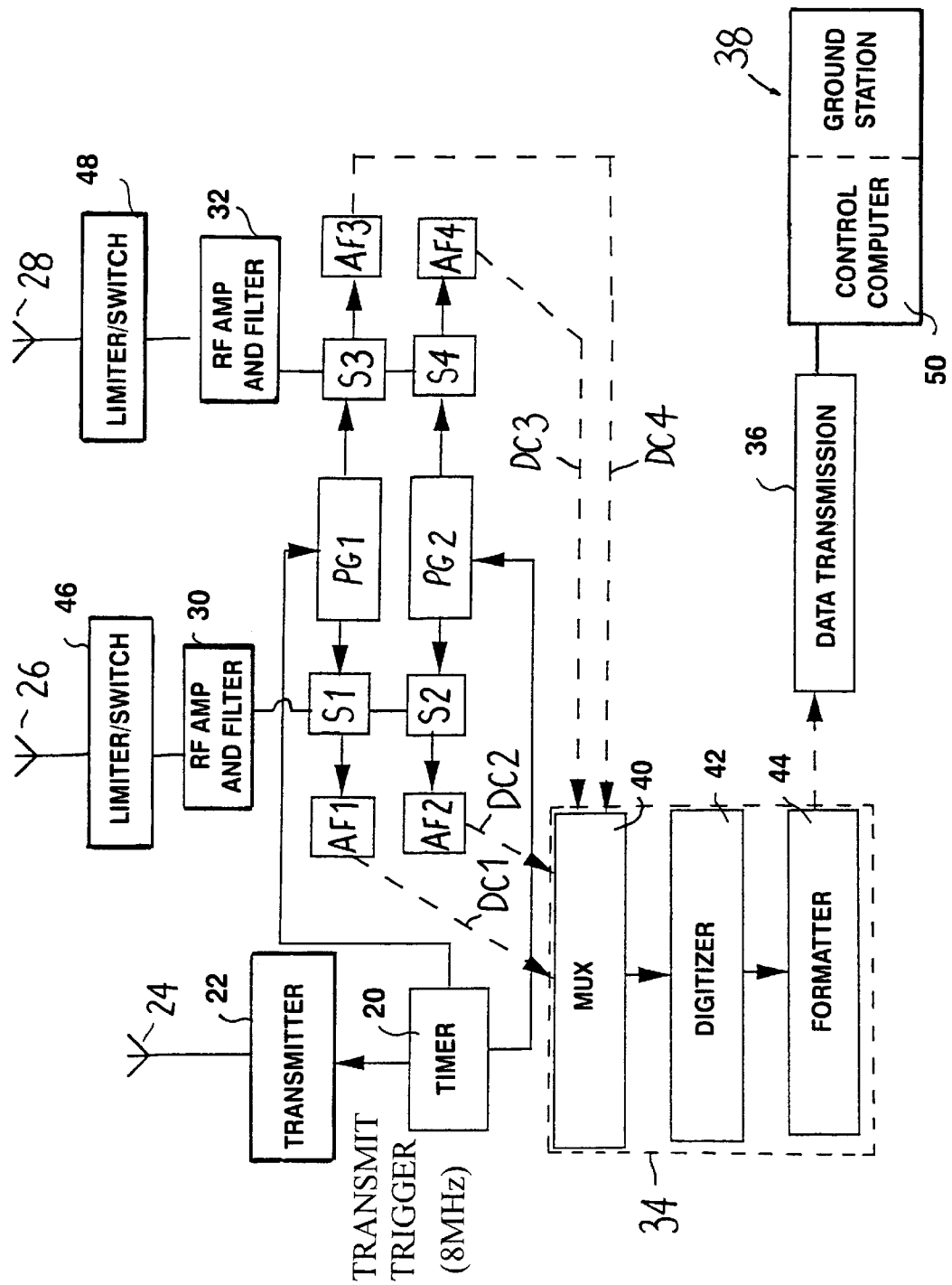
FIG. 5 is a schematic representation of the present invention.

Referring now to FIG. 5, this figure is a simplified schematic representation illustrating the hardware implementation of the present invention. Those features which are similar to features in the corresponding prior art figure (FIG. 2) are represented by the same reference numerals, and a description of these features is not repeated here. For simplicity, the representation shows the same number (two) of receive antennas 26 and 28 as FIG. 2, albeit that in practice several more would usually be provided.

Particular features of note are firstly that the data processor 34 comprises an analogue multiplexer 40, digitization means 42 and data formatting means 44. Thus each AF processing unit produces a signal which is digitized and then transmitted to an ultimate location where it is processed, namely the ground station 38. The bandwidth required is proportional to the number of range gates employed in the system. The data processor itself may have some capability to self-test in real time; in this circumstance the self-test capability of the ground station can be appropriately reduced.

Secondly, limiters or switches 46 and 48 are added in the signal path between the receive antennas 26 and 28 and the RF amplifiers and filters 30 and 32. These are added in order to avoid overload of and possible damage to the receivers if they were to receive an excessively large direct wave from the transmitter, such as might occur especially where the separation between the receivers and the transmitter were particularly great. Generally either a limiter or a switch would be provided. The limiter limits the received power to within a certain range. The switch on the other hand actually switches off the received power until it is within an acceptable range. The switch is actually more advantageous. If a narrowband filter is coupled to the front end of the receiver, this may cause a long time response which may be modulated b timing imperfections to give rise to noise in the receiver which may interfere with the range gates. Such noise is proportional to the amplitude of the exciting signal, and hence a switch could complete eliminate such a response, whilst a limiter would only limit it.

Thirdly and finally, it is noted that all of the apparatus in shown in FIG. 5, with the exception of the ground station 38, can for cheapness and simplicity be embodied on a single electronic card, although of course multiple cards are also possible.

Before further detailed explanation of the apparatus is embarked upon, the pulse generators (PG1 and PG2) are discussed. Such pulse generators generate a detection timing signal to drive the very sharp samplers (or sampling bridges—S1 to S4) at a delay after the transmit pulse transmission time, corresponding to at least one selected range for the target, thereby generating a range gate. Pulse generators of this type have a time delay from trigger to generating the pulse that is uncertain to order 1 nanosecond. Hence apparatus, such as the known apparatus shown in FIG. 2, based on triggering each sampler from a different pulse generator can not control the delay of range gates relative to different receive antennas to better than around 150 mm in range.

By comparison, the present invention can control the relative delay to an uncertainty of better than a few mm, that is a few tens of picoseconds. In this case, the pulse generator PG1 generates the trigger pulses both for the sampler S1 and for sampler S3; in other words the samplers are actuated by a common detection timing signal. This is achieved by splitting the pulse output between multiple samplers (thus with 4 receive antennas the PG1 output could be split between 4 samplers, to define range gates at the same delay for the 4 antennas). Hence by controlling the length of the tracks from the pulse generator PG1 to the samplers S1 and S3 at different receive antennas 26 and 28 the differential delay between the range gates for different antennas can be controlled. In particular, if such tracks are of equal length then the range gates will be at the same delay for each antenna, which is the preferred configuration. Likewise the pulse generator PG2 drives samplers S2 and S4 at a different delay after the transmit pulse transmission time for all receive antennas.

Thus this first particularly important feature of the present invention, namely the sharing of pulse generators, can typically reduce the required number of pulse generators from $N_1$=(the number of range gates) to $N_2$=(the number of range gates divided by the number of antennas).

Another, second, important feature of the present invention is to form a number of range gates with a single sampler (S), audio frequency processing unit (AF) and data channel (DC) so that the three dimensional trajectory of the target can in principle be derived from the output of a single sampler per receiver. This feature is typically only applicable when there is known to be a single target of interest near the sensor apparatus which moves with well-defined dynamics. Of prime interest is the case when the single target approaches the sensor to some minimum distance and then it recedes again. In this case, as in the prior art described above, the curve of range versus time is approximately a hyperbola as in FIG. 11 (discussed later).

Figure 6:
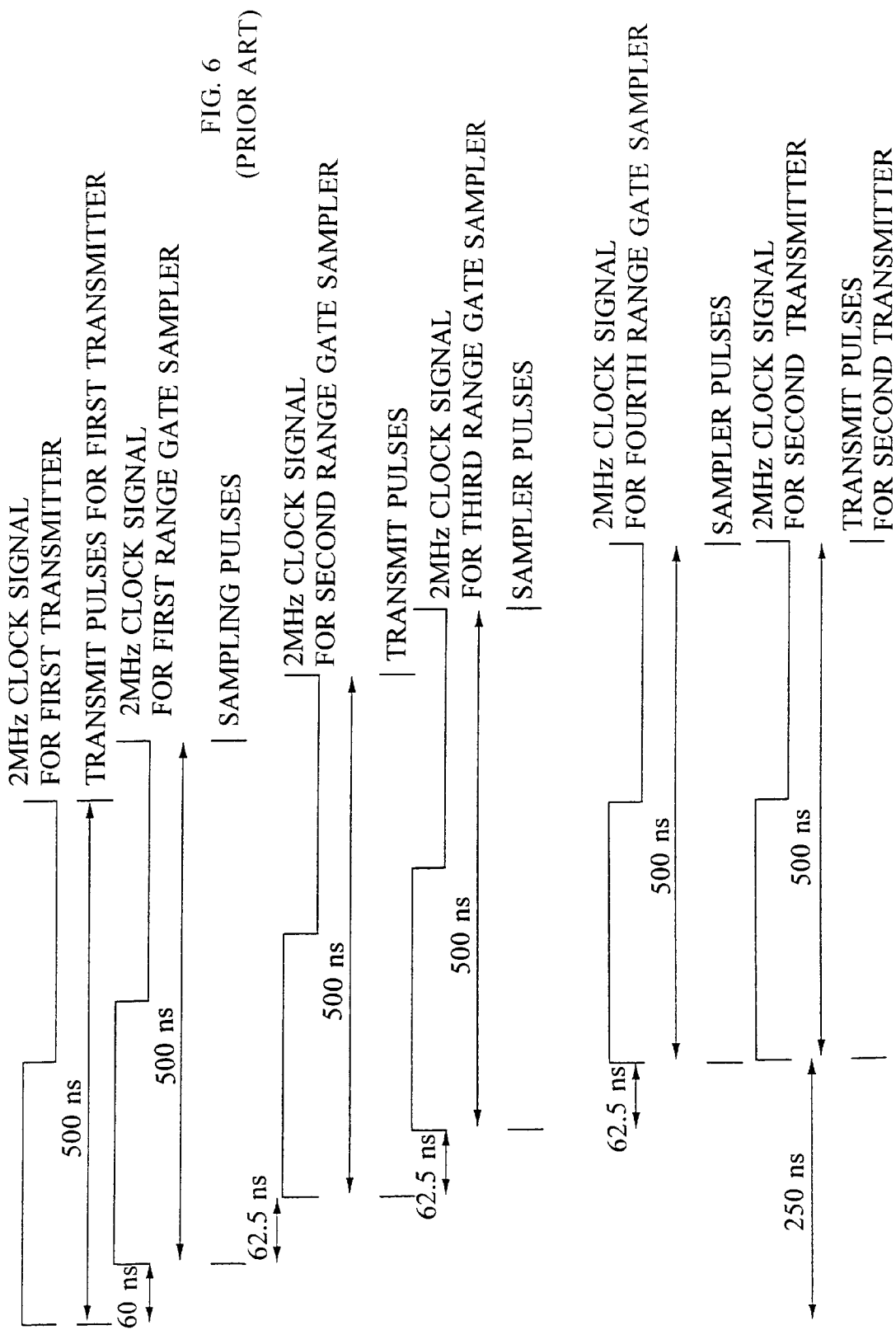
FIG. 6 is a modified timing diagram for the known apparatus.

In the apparatus known from International Patent Application No. PCT/GB90/00602 the pulse repetition frequency of the system is chosen so that only one transmit (probe) pulse is in flight in the detection volume at one time. Hence any reflection observed is at a well-defined unambiguous delay defined by the time interval between transmitting the transmit pulse and sampling the return signal. So, for the apparatus as actually put into practice, the maximum range was 38 m, which was covered by two transmitters operating in time division multiplex as shown in the modified timing diagram of FIG. 6. The maximum pulse repetition frequency to avoid having multiple pulses in the detection volume simultaneously is 2 MHz so that the spacing between the individual transmit pulses is 250 nanoseconds. Each range gate is fired at the same 2 MHz frequency with a fixed time delay with respect to the transmit pulses. This again is illustrated in FIG. 6. In this figure, the samplers form range gates at 60, 122.5, 185 and 247.5 nanoseconds (that is, at ranges of 9.14, 18.67, 28.19 and 37.72 m).

Figure 7:
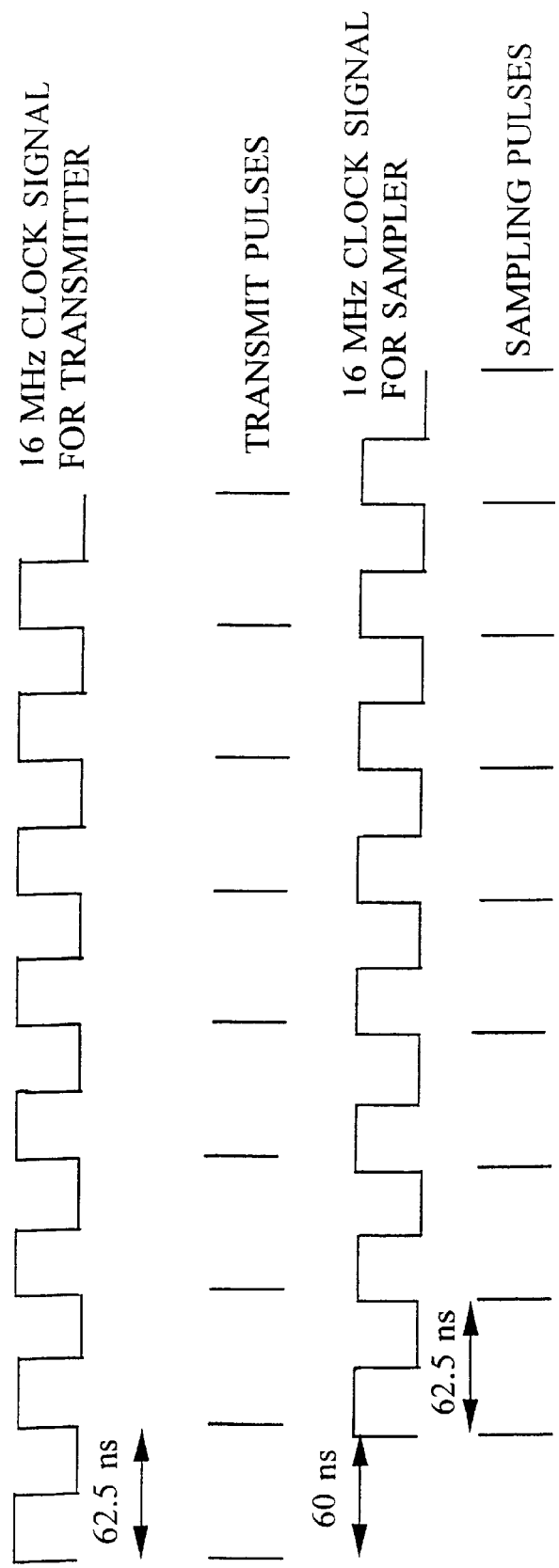
FIG. 7 is a timing diagram for a first preferred realization of the apparatus according to the present invention.

This second feature of the present invention involves firing the transmitters and samplers at a much faster rate, for example as shown in FIG. 7. In broad terms, any reflection observed is not at a completely unambiguous delay but so long as the target length is less than the range gate separation then if there is only a single target close to the senor it must be that the reflection must originate from only one of the small number of delays at which the sampling operates. As taught later, the sequence of signals observed enables the processor to infer the actual range gate ranges of signals multiplexed through the sampling element.

First Preferred Realization

In more detail, FIG. 7 shows as a first preferred realization of this concept a timing diagram for a simple example apparatus with a single transmitter operating at 16 MHz and a single sampler per receiver also operating at 16 MHz. The transmit pulses are triggered on the rising edges of the clock signal, as are the sampling pulses. Using a single clock, the clock signal for the sampler may be derived from the clock signal for the transmitter via a delay line yielding a delay of 60 ns, or, preferably, a delay line of 2.5 ns may be placed in the transmitter circuitry, hence achieving the same effect. The delay is chosen so that the sampler is triggered just before the next transmit pulse, in order to provide maximum recovery from the previous transmit pulse and yet to avoid any noise pick-up from the transmitter firing near the highly sensitive receiver element. Each sampling pulse is typically less than 500 ps in duration, and more particularly typically between 100 and 300 ps in duration, corresponding to a few centimeters in range. It will be appreciated that use of a single timing device for timing both transmission and detection can enhance accuracy.

Each sampling pulse will see reflections from each of the 4 previous transmit pulses at nominal delays of 60, 122.5, 185 and 247.5 nanoseconds (corresponding to range gates at ranges of 9.14, 18.67, 28.19 and 37.1 m). Indeed, this sequence continues further at 62.5 nanosecond spacing, but the amplitude of the signals decreases as the fourth power of range and eventually dies below the noise floor, and it is assumed in the present explanation that in fact only reflections from the previous 4 transmit pulses can be detected so that the furthest range gate is at 37.71 m (which is therefore one half of the maximum detectible (bi-static) path length of the transmit pulse). It has been found empirically that typical target responses are of a length corresponding to 1.2 to 1.7 times the target length and so the apparatus here illustrated is suitable for targets of length up to around 5.5 m, given that the target response is preferably not greater than the range gate separation.

The apparatus known from International patent application No. PCT/GB90/00602, configured with a single transmitter and four receivers, would require 16 pulse generators, 16 samplers, 16 audio frequency processing units and a data bandwidth proportional to 16. By comparison, the present invention can in this first realization yield the same useful information with only 1 pulse generator, 4 samplers, 4 audio processing units and with a data bandwidth one quarter of that of the prior art apparatus. Also, the timing module is much simpler because only two clocks are required whereas the prior art required five clocks to form the sequence of 4 range gates.

It should be noted that the range gate delays can not be chosen arbitrarily. The preferred constraints are:

(a) The minimum value of range gate delay should preferably place the range gate outside the extent of the object on which the apparatus is mounted to avoid or minimize reflections from the object itself.

(b) The range value should preferably be chosen so that the apparent orientation of the target is nearly the same at all receivers, and the signature received by the various receivers hardly differs as between the receivers. So preferably the orientation of the target should be within ten degrees at each receiver, more preferably within 5 degrees and possibly still more preferably within three degrees. Hence, for example, if the separation of the antennas were 0.5 m, the minimum preferred range gate delay would be 2.86 m, more preferably 5.73 m and still more preferably greater than 9.55 m. This value of preferred delay scales in proportion to the receiver separation. However, if it were true that this condition were violated at the inner range gate or gates, processing could still continue. During the correlation processing (described in more detail later), the control computer 50 is programmed to ignore data points where correlation is not possible.

(c) In order to prevent the target being detected simultaneously or near simultaneously in two different range gates, the range gate separation should preferably be greater than the expected target length and more preferably greater than 1.2 times the target length or more preferably still greater than 1.7 times the target length. These values will increase with the length of the transmit pulse which in such apparatus is typically less than 3 nanoseconds. The transmit pulse repetition frequency dictates the range gate separation, and hence it will be apparent that the larger the target, the lower must be the frequency.

(d) The constraint in (c) above can impose a maximum pulse repetition frequency which depends on the target length and transmit pulse length. For a 2 nanosecond pulse and a target 4 m long, this would equate to at least 15 nanoseconds, which corresponds to a pulse repetition frequency of 66.67 MHz for a single transmitter system. The allowable pulse repetition frequency of 66.67 MHz for a single transmitter system. The allowable pulse repetition frequency is inversely proportional to the number of transmitters in situations where the receiver forms range gates with respect to any transmit pulse. More preferably, the apparatus employs one or two transmitters with a pulse repetition frequency of no more than 18 MHz for targets of length up to around 5 m. A pulse repetition frequency of 18 MHz corresponds to a pulse repetition frequency path length of approximately 17 m.

Second Preferred Realization

Figure 8:
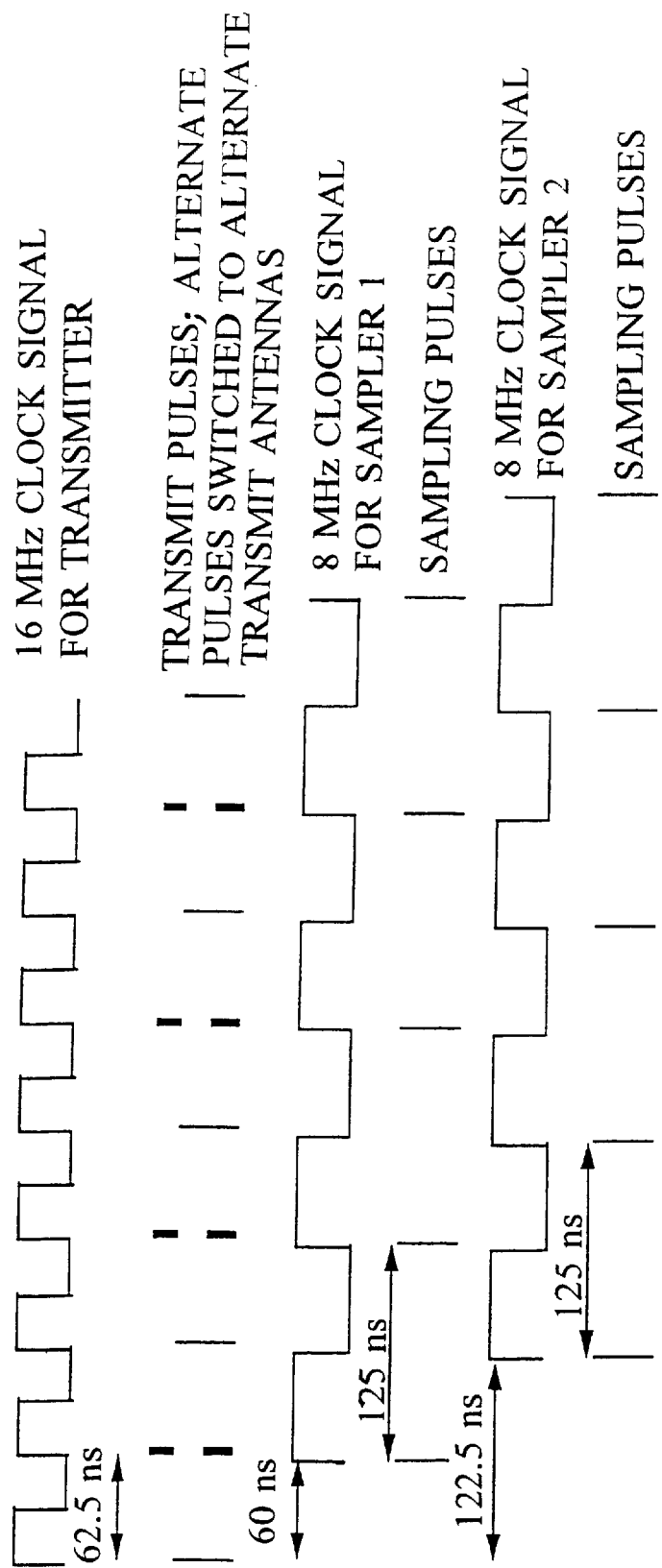
FIG. 8 is a timing diagram for a second such preferred realization.

A second preferred realization of a similar concept has a timing diagram as shown in FIG. 8. This realization employs two transmit antennas, driven by the need to provide as nearly as possible full 360° solid angle coverage, and hence is particularly preferred.

In this realization, a single transmitter is switched between 2 transmit antennas with the transmitter operating at 16 MHz and two samplers each operating at 8 MHz; each transmit pulse from either transmit antenna is of the same amplitude. The timing diagram illustrates the timing of signals from the single receiver to the two samplers, sampler 1 and sampler 2. In the figure, the pulse from the first transmit antenna is denoted by a solid single narrow line, whereas that from the second transmit antenna is denoted by a double dashed thicker line.

In the second realization, assuming again that the furthest detectible range gate is at approximately 38 m, each sampler forms two range gates with respect to the first transmit antenna and two with respect to the second. Hence a given sampling pulse, say for the first sampler, forms gates from the first transmit antenna at delays of 60 and 185 ns, corresponding to ranges of 9.14 and 28.19 m. These gates are, as explained later, termed "real gates". The same sampling pulse for the same first sampler also forms gates from the second transmit antenna at delays of 122.5 and 247.5 ns, corresponding to ranges of 18.67 and 37.71 m. These gates are termed "ghost gates". The delays of 60, 122.5 ns and so on are again chosen such that the samplers sample just before the transmitter transmits.

Reference has been made to "real" and "ghost" gates. This is in recognition of the fact that typically the apparatus of the present invention would be mounted on an aircraft, with one transmit antenna and, say, three receive antennas, being used to cover the underside of the aircraft and the same number for the upper side. As previously described, the three upper antennas are associated with "real" gates, whilst the three lower ones are associated with "ghost" gates.

Notwithstanding the use of the term "ghost" gates, and despite the positioning of the lower receive antennas, it will be appreciated that, considering as an example a target whose trajectory is solely above the aircraft, in general the lower transmit antenna will give rise to, and the lower receive antennas will receive, return signals from such a target. This is because of the effects of diffraction which are noticeable at the pulse repetition frequencies being proposed.

It can now be understood that the second sampler yields real gates (at the same ranges) where the first sampler yields ghost gates (and vice versa), and that hence the two samplers are complementary.

If a second receiver were provided, and a second set of two samplers for the second receiver, timed equivalently to the first set for the first receiver, then it is noted that the apparatus shown in FIG. 5 could be employed to implement the timing of the second realization without modification.

However, in one typical practical preferred embodiment in fact six receive antennas are employed, again with two samplers per antenna, and with in total two transmit antennas. The analogous apparatus as foreshadowed in International patent application No. PCT/GB90/00602 would have two transmit antennas, six receive antennas and 8 range gates per antenna. It would hence require 48 pulse generators, 48 samplers, 48 AF processing units and a data bandwidth proportional to 48. The second preferred realization of the present invention would by contrast require 4 pulse generators, 12 samplers (2 per receiver together now forming 8 range gates) and 12 AF processing units, and a data bandwidth proportional to 12, which is again one quarter of the prior art bandwidth.

If 4 pulse generators were provided, then each pulse generator would generate timing signals for 3 samplers respectively coupled to 3 of the 6 receive antennas. However, in order to provide controlled differential timing across all 6 antennas it would be preferable in fact to employ a single pulse generator across all the receive antennas, and more preferable still to employ a single pulse generator to trigger all the samplers, so that preferably only one pulse generator in total is provided. With reference to the schematic representation shown in FIG. 5, this would be achieved by replacing the pulse generators PG1 and PG2 by a single pulse generator trigerred at 16 rather than 8 MHz. The pulse generator would either be provided with switching means to trigger the first set of samplers (S1, S3, S5, S7, S9 and S11) on odd numbered cycles and to trigger the second set of samplers (S2, S4, S6, S8, S10 and S12) on even numbered cycles, or else pulses of alternating polarity would be generated, and the samplers would be configured to operate on only one of the two polarities. This last is the most preferred configuration. However the samplers are in fact controlled between these three possibilities, the data bandwidth is still proportional to twelve.

The distribution network from the pulse generator to the sampler contains no components giving rise to varying differential delay or any reflections that are sufficient to re-trigger a sampler. Such is the case when the distribution is accomplished by a tapered transmission line where width provides a change in impedance at each sampler connection such that the impedance of the sampler in parallel with that of the output distribution line is the same as the input line.

In the timing diagram of FIG. 8, the minimum separation between real and ghost range gates superposed in a single channel is 9.5 m. It has been found empirically that typical target responses are of a length corresponding to 1.2 to 1.7 times the target length and so the system here illustrated is suitable for targets of length up to around 5.5 m. In order to ensure that the ghost range gates described in FIG. 8 conform to this separation constraint, it is necessary that a single transmitter is switched between the two transmit antennas. That is because, as with the samplers, the turn-on time of the transmitter from the trigger signal is uncertain to a few nanoseconds and more precise control than that is required for the present purposes.

Third Preferred Realization

Figure 9:
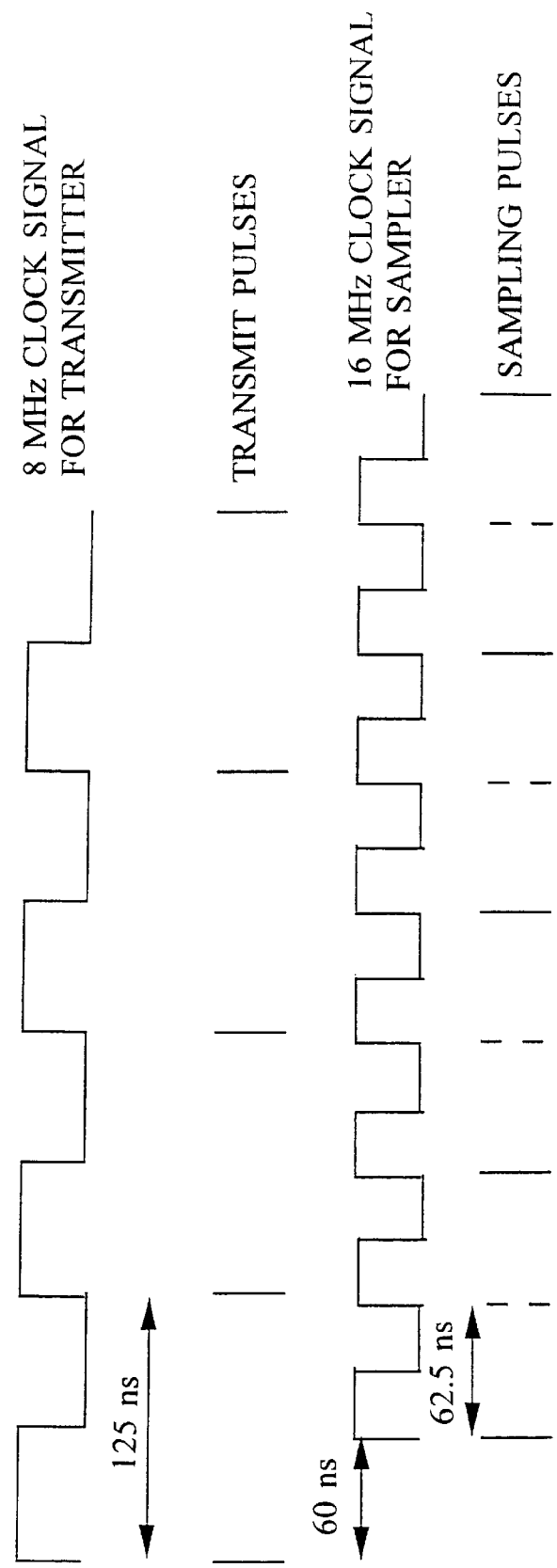
FIG. 9 is a timing diagram for a third such preferred realization.

A third preferred realization of the present invention is illustrated in FIG. 9. In this case, the samplers are triggered at a multiple of the transmitter trigger rate, with alternate sampling pulses forming different range gates. FIG. 9 illustrates the example of a single transmitter system running at 8 MHz with a sampler running at 16 MHz. In this case, exactly the same range gates are formed as in the first and second realizations, namely at 9.14, 18.67, 28.19 and 37.72 m (assuming a furthest range of roughly 38 m). However, in the present realization, the first trigger of the sampler (represented by a solid line) produces the second and fourth range gate, and so on alternating pulse to pulse.

The third realization has the disadvantage by comparison to the second realization of producing half the signal-to-noise ratio of the earlier realizations where each firing of the sampler forms all range gates simultaneously (that is, for a given range gate, only half the number of transmit pulses contribute to the output). However, it has the advantage that the transmit pulse repetition rate is lower, which may be important where hardware restraints are imposed on that rate. Also, one rather than two samplers is required per receiver.

Fourth Preferred Realization

A fourth preferred realization of the present invention is now described. One way of viewing the concept underlying the preceding realizations is to observe that, in contrast to the prior art apparatuses referred to, the multiple range gates are formed in a single data channel. The present realization achieves this, but avoids employing multiple pulse in flight techniques (that is, where more than one transmit pulse is in the detection volume at one time). With reference to the prior art known shown in FIG. 2, in the fourth preferred realization the sampler outputs S1, S2, S3 and S4 are summed at the output of the sampler and processed in a single audio frequency processing channel. In this way, the data rate reduction of the other realizations is achieved. However, the noise bandwidth of the apparatus is inversely proportional to the pulse reception frequency so that, for the same transmit pulse power, the multiple pulse in flight techniques deliver enhanced signal-to-noise for a given target at a given range.

Fifth Preferred Realization

A fifth preferred realization of the present invention of the multiple range gates in a channel typically pulses the transmitter faster than the sampler, but adjusts the amplitude of the transmit pulse pulse-to-pulse. The purpose of this is to use a larger transmit pulse corresponding to long ranges and a smaller transmit pulse corresponding to short range gates. This has the benefit of limiting the dynamic range of the signals going through a sampler. Advantageously the power amplitude is modulated according to the inverse of the fourth power of range, corresponding to the attenuation of the return signals.

Figure 10:
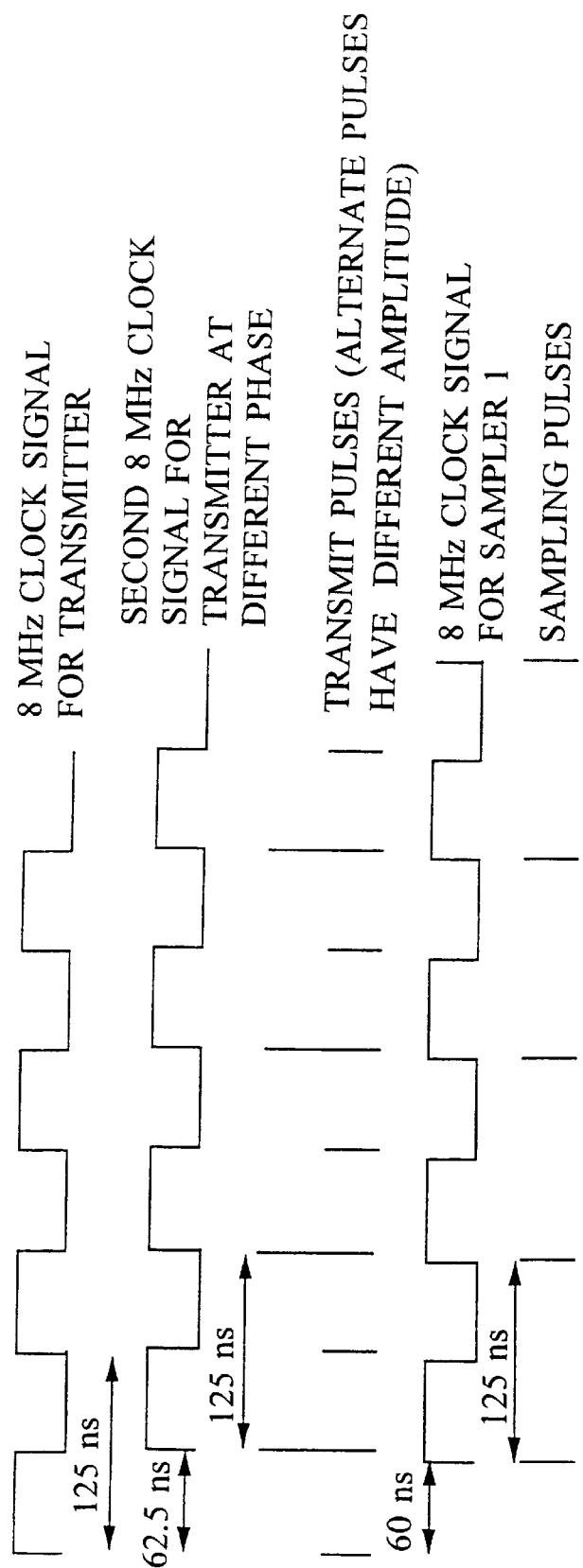
FIG. 10 is a timing diagram for a fifth such preferred realization.

A possible timing diagram for the fifth realisation is illustrated in FIG. 10. In this case, two transmitters are run from two independent clocks and switched into the transmit antenna alternately, with the first transmitter connected through an attenuator or simply being of a lower power. Another possible realization of the same ultimate function would be to connect the transmitter output to a long delay line with attenuation. In this case, the transmit antenna would see an initial pulse and then a further smaller pulse at a delay determined by the length of the delay line.

If the furthest range is again assumed to be roughly 38 m, then "real" gates from low power pulses are formed at delays of 60 and 185 ns, corresponding to ranges of 9.14 and 28.19 m. "Ghost" gates are formed from higher power pulses at delays of 122.5 and 247.5 ns, corresponding to ranges of 18.67 and 37.71 m. Hence the furthest gate is formed from a higher power pulse than the nearest gate.

The concept of modulating the amplitude of the transmit pulses can of course be applied in various ways, and is not restricted merely to the timing diagram shown in FIG. 10.

For example, the amplitude of expected returns varies as the inverse square of range. Thus, in the case of FIG. 10, if the sampling delay with respect to the small transmit pulse were t and that with respect to the large pulse 2t then the preferred relative amplitude would be that the large pulse would be four times the amplitude of the small pulse. This can be generalised. Hence, with for instance four transmit pulses transmitting n a single sampling period, if the delays from transmitter to sampler were t, 2t, 3t and 4t then the preferred corresponding voltage amplitudes would be proportional to 1, 4, 9 and 16 respectively. In such cases, the sampler is preferably only activated once in each cycle of four transmit pulses.

A further realization analogous to the fifth realization is to provide a number of samplers of different sensitivity (or even vary the sensitivity of the same sampler).

PROCESSING FOR THE PRESENT INVENTION

The data derived from the samplers naturally requires processing in order to derive information concerning, for instance, the trajectory of the target, the nearest miss distance, and so on. In the preferred embodiments initial processing is carried out in the audio-frequency range at the ground station 38, typically by means of computer software implemented in a control computer 50 forming part of the ground station. Alternatively, such final processing could be carried out on board the aircraft.

Details of the requisite processing are now provided.

Figure 11:
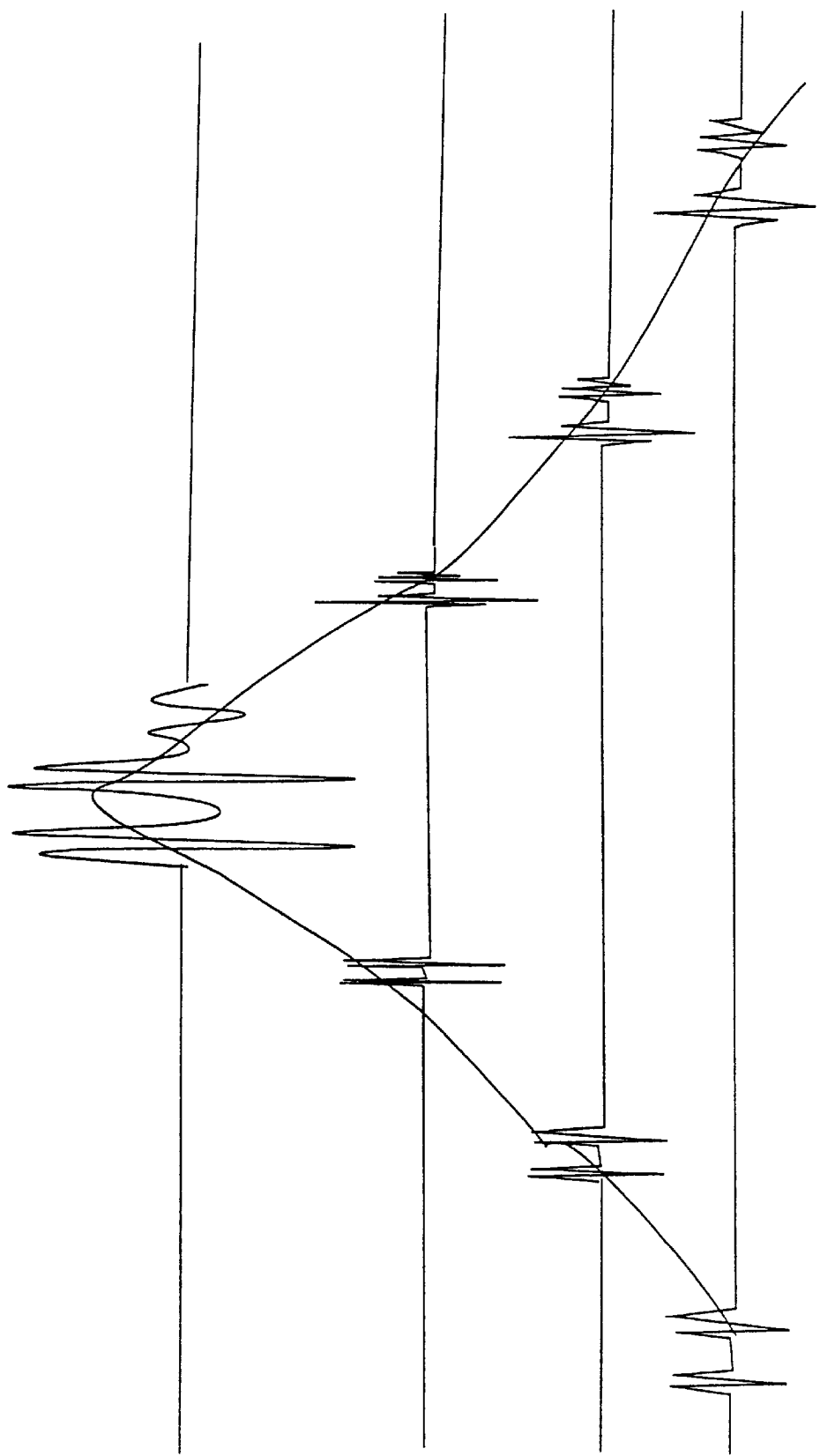
FIG. 11 shows an expected signal pattern yielded by the known apparatus for a single receive antenna.

Determining the Target Trajectory from Range Gate Crossings (a) Detecting the characteristic hyperbola For a target that approaches the object (aircraft) monotonically and then recedes the apparatus as foreshadowed in International patent application No. PCT/GB90/00602 yields signals at the various range gates for a single receive antenna like those shown in the diagram of FIG. 11 The diagram (not to scale) illustrates at the bottom of the page the signal at the furthest range gate and at the top of the page the signal at the nearest gate. As the target passes through the gate, the gate is disturbed and then goes quiet until the target flies out again. FIG. 11 shows the characteristic hyperbolic range time curve corresponding to the target trajectory.

One preferred embodiment of the present invention also accomplishes detection of a target by detecting the characteristic hyperbola, as is now described.

Figure 12:
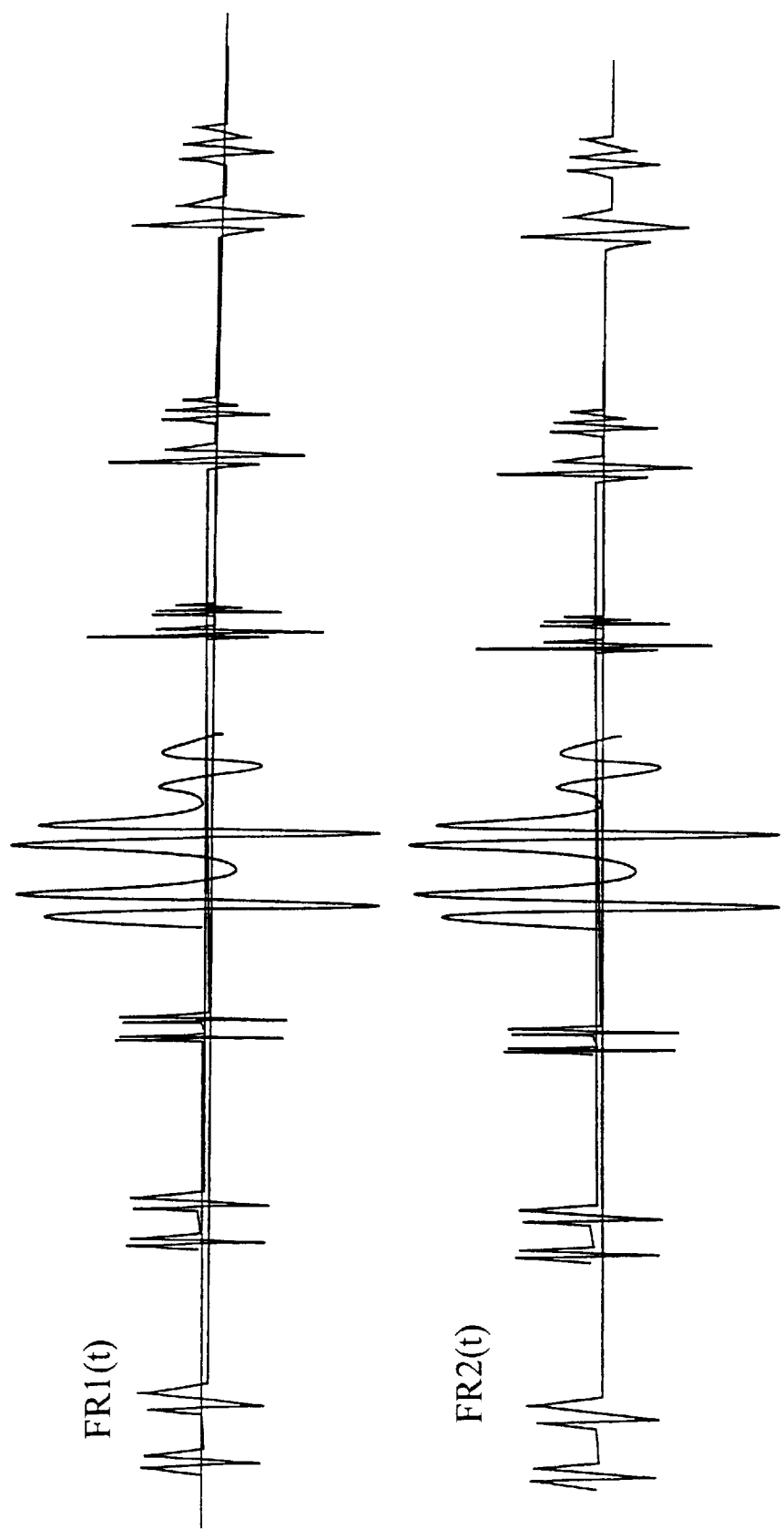
FIG. 12 shows an expected signal pattern yielded by the apparatus of the present invention for two receive antennas.

With the apparatus of the present invention as described above, the range gates for a single receive antenna for a corresponding trajectory will yield signals like one of the two channels shown in FIG. 12. The signals received at two receive antennas are shown since this is needed to explain the processing. The particular realization illustrated is the first realization, namely apparatus with a single transmitter running at 16 MHz (as in the timing diagram of FIG. 7). The figure (which is not to scale) illustrates the superposition of the signals at different ranges in one channel. As with FIG. 11, as the target passes through the gate, the gate is disturbed and then goes quiet until the target flies out again. Nonetheless, the information content is equivalent to that in FIG. 11, and the same hyperbolic pattern is derived by de-interleaving the signals, that is, separating out the channel information for each range gate. The de-interleaving procedure is described in sub-section (c) below.

(b) Use of cost function to resolve ambiguities caused by the multiple pulse in flight technique A second challenge that arises from the sensor enhancements is that each sampler develops a set of range gates and it may not be clear when the cut-off occurs. Specifically, a return signal detected by a sampler is not unambiguously associated with a particular range gate; it may be from any range gate generated by that sampler. A possible way of distinguishing signals from different range gates might be by assessing their relative amplitudes, but such a technique would not usually be particularly reliable.

To exemplify the ambiguities, reference is now made to the first realization illustrated with reference to the timing diagram of FIG. 7. The single sampler develops range gates at approximately 9, 18, 27, 37, 46, . . . m (dependent of course on the furthest detectible range). Now the question arises as to how the apparatus can reliably tell the difference between a situation where the target crosses three range gates at for example 27, 37 and 46 m and the one where it crosses the range gate at 18, 27 and 37 m and is not seen at 46 m because for the particular target size the signal was too weak to detect. Indeed, of course, as a third alternative the target may only be seen at the three innermost range gates.

Such a problem is resolved by determining which of the possibilities most closely matches the characteristic hyperbola of the engagement.

The pattern matching technique described in International patent application No. PCT/GB94/00738 could be used to detect the characteristic hyperbola. Note that in this case there will be ghost hyperbolas but that the correct one will be formed from the maximum number of events and hence can be distinguished from the other such hyperbolas.

However, with the present invention it is preferred to use a cost function, of the form as now discussed. Where the target motion is approximately a straight line the range time curve corresponds to a hyperbolic trajectory:

$$r^2 = (r0^2 + v^2(t-t0)^2) \quad (1)$$

Hence we can define a cost function C, where $$C = r^2 - (r)^2 + v^2(t-t0)^2) \quad (2)$$

where v is the relative speed of the target, t is time, t) is the time of closest approach, r is range and r0 corresponds to the distance of closest approach which is attained at t0. It will be understood that the value of the cost function is 0 if the target trajectory is a perfect hyperbola and greater if not. This solves the problem because, although the gate separations are the same for any triplet, the squares of the range are very different for different tracks. So the method employed to resolve the ambiguity is to solve equation (1) for r0 and v for the various possibilities of range gates crossed and then pick the solution with the lowest cost function (equation (2)) searched over the small number of range gate possibilities. For instance, in the case cited above, C would be evaluated for the three possibilities, namely ranges of 9, 18 and 27 m, or 18, 27 and 37 m, or 27, 27 and 46 m. The configuration which yielded the minimum value of C over three possibilities would be chosen.

If the target only approaches the object, but does not recede, then the characteristic hyperbola cannot be detected. However, the range gate ambiguities ca in this case be resolved from a knowledge of the time at which the data stream stopped.

It should be emphasised that the cost function is being used only to make a coarse distinction between the various range gates, merely to resolve the range gate ambiguity. It is not being used to provide a detailed assumption about the trajectory of the target. Hence the present invention can cope with any plausible target trajectory, and need not be limited to a hyperbolic target trajectory.

(c) De-interleaving

In this sub-section is taught how the techniques taught in the previous two sections are used to achieve de-interleaving of the signals to separate the information for each range gate.

The de-interleaving may be carried out in a number of ways including, firstly:

(a) detecting the high amplitude signal and then the quiet zone following it and then the next signal, and so on; and (b) duplicating the channels to form the expected hyperbolas.

Figure 13:
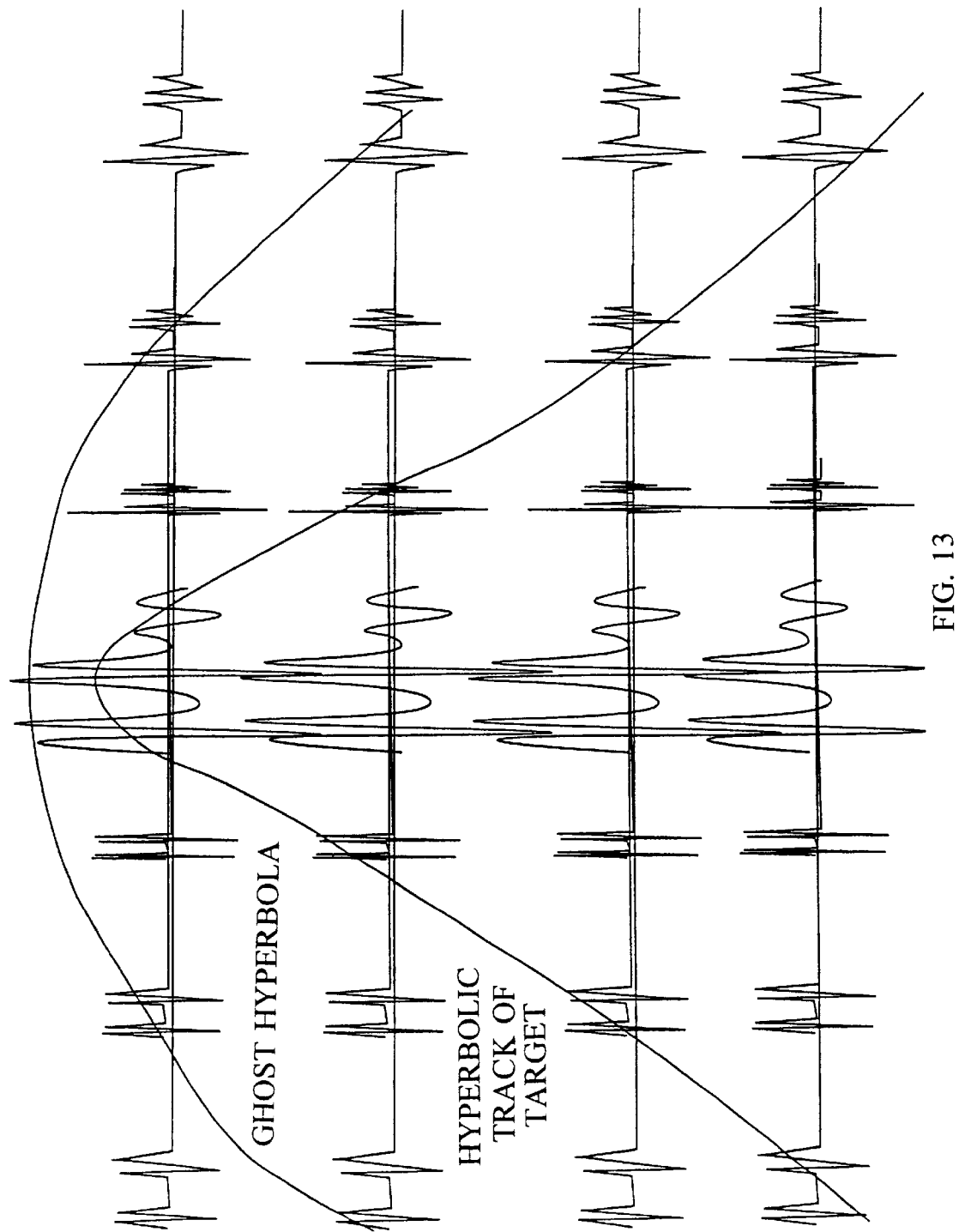
FIG. 13 shows the signal pattern of FIG. 12 in duplicated form so as to reveal a characteristic hyperbolic pattern.

The second possibility is illustrated in FIG. 13, where the signal from one receiver (say of the third realization illustrated with reference to FIG. 10) is duplicated 4 times.

With reference to the first of these ways, and in more detail, the de-interleaving operates with the following steps:

(1) Individual target return signals are identified by thresholding, such that return signals above a given threshold and with approximately long quiet zones are identified as return signals from the target (as per step (a) above).

(2) The timings of the mid-points of each of the individual return signals are stored.

(3) The channels are then duplicated (as per step (b) above).

(4) The characteristic hyperbola is fitted to the various individual return signals, as duplicated, with the cost function as described in sub-section (b) above being used to determine the range/velocity pattern that gives the best fit to the channel data. In the cost function, velocity v is evaluated from the (known) physical separation of the range gates and the timing interval between the relevant individual return signals.

(5) The correct range gate is evaluated from the best hyperbolic fit.

Hence the result of the de-interleaving process is a determination of the timing of the mid-point of the relevant individual return signal, together with its range gate value.

Determining Positional Information from the Differential Delay (a) Determining the positional information In the previous section, one way of determining positional information for the target has been described, namely by determining the target trajectory from range gate crossings. This is not a real time technique since it requires the evaluation of a cost function once a number of gate crossings have been detected. In the present section, further techniques for determining positional information for the target are discussed. One of these is a true real time technique.

If the hardware enhancements constituting part of the present invention (in other words the features of the apparatus as described above) merely combined range gates in the same basic hardware by use of multiple pulse in flight techniques then this would produce a cost benefit but would not address the problem of having a low cost sensor which can be mounted on a very compact object.

The requirement for such a low cost sensor mounted on a very compact object is addressed by the first important feature of the invention as described above, which uses a common pulse generator for each sampler across all receive antennas. In a preferred embodiment the lengths of the tracks from the pulse generator to the sampler are all the same. FIG. 4 shows a range gate at the same delay for offset receive antennas. In fact, a given differential delay puts the missile on a hyperboloid whose foci are at the two receive antennas. In the case where the range gate is much larger than the spacing between the antennas, this hyperboloid is approximately a cone whose axis is the line joining the two antennas and whose semi-angle is determined by the differential delay. Combining this knowledge with the known range of the range gate places the target on the inter-section of a sphere and a cone, which is a circle, as shown in FIG. 4. This knowledge can in turn provide useful information concerning possible information concerning the object being detected.

Alternatively or additionally, by combining the results from different receiver pairs the position of the missile can be triangulated. This requires at least three non-coplanar receiver pairs to define the missile position in three dimensions.

Triangulation can be achieved as follows. It is noted that, strictly speaking, the following analysis is valid only when the range gate delay is large compared to the antenna separation so that the normals parallel to the two range gates of interest are parallel and coincide with the centre of the range gate (in preferred embodiments the antenna separation may be 0.3 m while the nearest range gate may be at 7 m so that this is easily achieved). It can be seen that the accuracy of the angular position of the target is dependent on the angular separation of the normals. If the normals were, say, 5° apart, this might give rise to an approximately 2.5° uncertainty in the angular position of the target, which would usually be acceptable. If the likely uncertainty were larger then the problem might be resolved by using more receivers.

For range gates at the same delay for each receive antenna, using the notation given in FIG. 4:

$$v.n\ \delta t = \lambda R.n$$

(this is true for both monostatic and bistatic systems.) It should be noted that $\delta t$ is the differential time delay as measured between two paired receive antennas. Also, the vector n is by definition a unit vector. Hence the scalar product v.n is equal to the separation of the range gates at the particular unknown value of $\theta$.

So for 3 receiver pairs we will get 3 equations like (3) namely $$v.n\ \delta t_1 = \delta R_1.n \quad (4)$$

$$v.n\ \delta t_2 = \delta R_2.n \quad (5)$$

$$v.n\ \delta t_3 = \delta R_3.n \quad (6)$$

It is noted that with four receivers arranged in a tetrahedral cluster in fact up to 6 receiver pairs and hence 6 values of $\delta t$ may be obtained. In any event, in vector form the above three equations can be written as $$v.n\ \tau = R\ n \quad (7)$$

Where $\tau$ is a column vector of the three values of $\delta t_1$ and R is a three by three matrix of the vectors $\delta R_1$. If the four receivers are not coplanar then R will be an invertible matrix and so:

$$v.n = 1/|R^{-1}\tau| \quad (8)$$

and the vector n is parallel to $R^{-1}\tau$, as can be seen from the fact that v.n in equation (7) is a scalar quantity.

Since the vector n is parallel to $R^{-1}\tau$, evaluating $R^{-1}\tau$ (without needing to evaluate v.n) thus yields the direction of the target as a unit vector. The position of the target is then given by the range of the relevant range gate as determined by detecting the characteristic hyperbola (as described in the previous section) and the three dimensional direction n. Thus the position can be defined through triangulation once $\tau$ has been derived. In turn, the normal component of the velocity of the target can now be evaluated from equation (8). Furthermore, given a timed succession of target positions and a trajectory (such as a hyperbolic trajectory) which fits these positions, the true target at any point can also be evaluated. Determination of velocity is discussed in more detail in sub-section (d) below.

In three dimensions, triangulation can be carried out, as described above, effectively by evaluating three independent angles and one range value. In this case, the process would not be considered to be real time, because a range value is required, and this entails a resolution after the event of the range gate ambiguity.

However, alternatively triangulation can be carried out in three dimensions purely by evaluating four independent angles. In this case, the triangulation process can be conducted in real time; in particular it does not require any resolution of the range gate ambiguity. Triangulation would be carried out by evaluating a fourth equation analogous to equations (4) to (6).

In certain practical situations it may of course be important to evaluate the target trajectory both from range gate crossings and from the triangulation process, and to compare the two, for greater certainty.

(b) Determining the differential delay

The manner in which $\tau$ is determined is now described in detail. $\delta t_1$, for example, is derived by correlating the two receiver outputs at each range (FR1(t) and FR2(t)) as shown in FIG. 12. The signals shown illustrate a typical situation where the signal backscattered consists of a peak from the front of the target and another return signal from the back of the target. The de-interleaving process has isolated the 7 discrete signals for each receiver. These may then be correlated across the two channels FR1 and FR2.

Hence the autocorrelation function $$\int FR1(u)FR2(t-u)du \quad (9)$$

is evaluated to determine the value of t corresponding to the peak correlation and hence to define the required differential delay.

The maximum correlation for each signature will occur when the signatures line up in time so that the value of the delay $\delta t_1$ at which the correlation between the first signal in FR1 with the first signal in FR2 is maximized must be determined. This may be accomplished by a simple search procedure because it is known that the maximum delay between the signals is the antenna separation and so the autocorrelation function only has to be searched over a very narrow range, which is convenient given that its evaluation is fairly computer intensive. Thus for each range gate a differential time can be derived for both the front and back of the target. Also, as stated previously, in solving equation (8) the normal component of velocity at each range gate can be evaluated.

(c) Determining attitude

Figure 14:
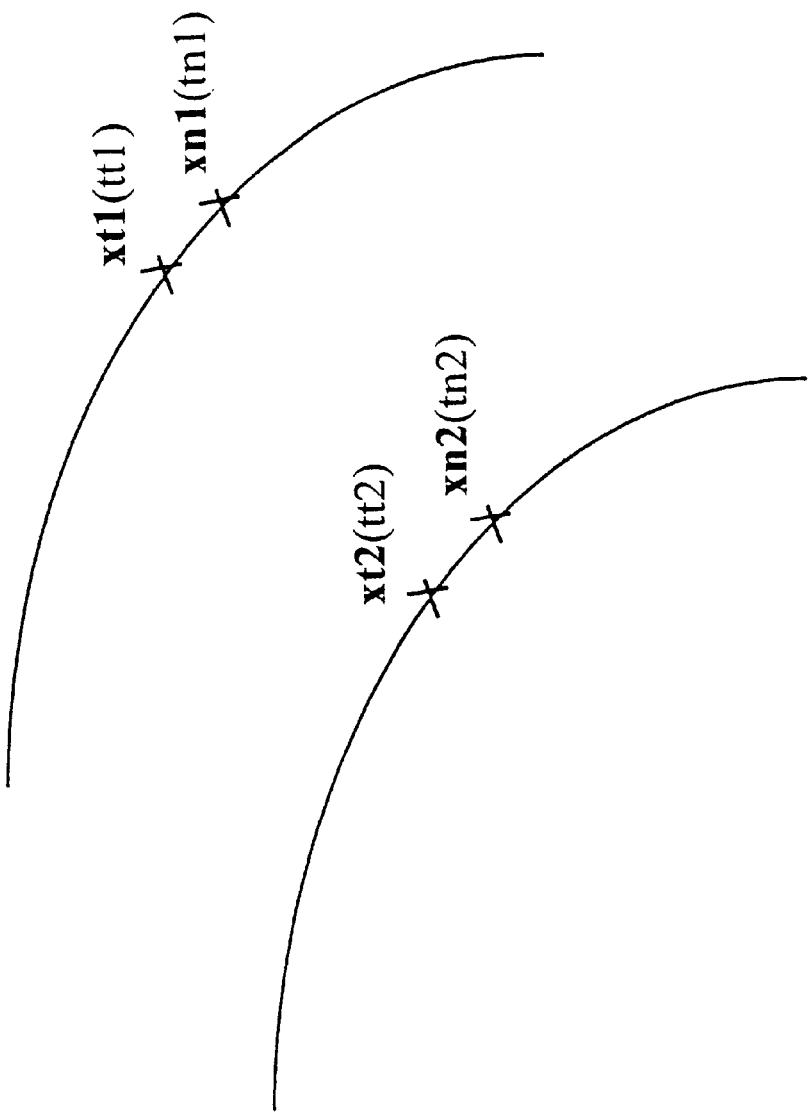
FIG. 14 is a diagram illustrating how the attitude of a target is evaluated.

Given that the position of the target can be evaluated (as taught above) a further challenge is to derive the attitude of the target. In order to do this the vector velocity of the target relative to the apparatus needs to be known. This can be derived as illustrated in FIG. 14. FIG. 14 shows part of two concentric range gates at a receiver where the position of the front (nose) and back (tail) of the target has been derived at the times that the respective feature crosses the range gates. Hence the positions of the nose respectively at range gate 1 and range gate 2 are denoted as xn1 and xn2, with corresponding crossing times tn1 and tn2, whilst the equivalent positions of the tail are xt1 and xt2 at crossing times tn1 and tn2. Thus an estimate of the target velocity is $$v = (xn2(tn2) - xn1(tn1))/(tn2 - tn1) \quad (10)$$

A consistency check is afforded by deriving the velocity of the back of the target in the same way and checking the difference in the values against an allowed limit.

Once this has been done the position of the front of the target can be derived at time tt1 when the back of the target crosses the range gate; hence $$xn1(tt1)=xn1(tn1)+v \times (tt1-tn1) \qquad (11)$$

Then the attitude of the target is by definition $$att=xn1(tt1)-xt1(tt1) \qquad (12)$$

or more commonly the attitude is defined by a unit vector in the direction of att.

(d) Determining velocity

In the preferred configuration with at least 4 non-coplanar antennas detecting the target at a range gate the velocity normal to the apparatus can be derived by solving equations (4), (5) and (6) as given above. In some practical situations, where multiple range gates are employed the target may be detected with all of the antennas at some range gates and not all of the antennas in others. In such a case, for situations where the target motion is pre-determined, an estimate of normal velocity at each range can be obtained from the solution to the hyperbolic fit of equation (2). This can be used to convert the differential delays inferred from the correlation process defined by solving equation (9) to delays in range by dividing by the normal velocity and one can then solve for angle as previously described.

A subsidiary is to employ apparatus where, for a single receive antenna, there are two range gates at very similar ranges and controlled differential delay (preferably within 150 mm, more preferably within 25 mm). This can be realized simply from the first feature of the invention described above by triggering the two samplers from the same pulse generator but employing a delay line of the required length to delay the trigger to the second sampler. In this case, cross-correlating the two range gate outputs would yield a time delay which from the known range separation would yield the normal velocity through the range gate. This value could then be used directly in equations (4), (5) and (6) to evaluate the target position.

The back scattered frequency of the signal is given by the doppler effect and is proportional to the normal velocity of the target, so by measuring the frequency or period of the backscatter a further estimate of the velocity can be made. Likewise, this can be derived from the period of fluctuation in the output of the cross-correlation as computed in equation (9).

Polarisation Processing (a) Effect of polarization

In general, the apparatus measures the differential delay of a transmitted radar pulse reflected from a target and received at two or more receivers as the target crosses a "range" gate defined by the sampling time delay after transmission. The differential timings from a number of receiver pairs can be used to determine simultaneously the position of the target in space and the component of its velocity normal to the range gate.

In the ideal situation as discussed above the received target signature is the same at all receivers and the differential delay can be determined by a straightforward correlation process. The accuracy of the differential timing estimate obtained by correlation processing depends primarily on the signal-to-noise ratio.

Practical experience of other types of such impulse modulated electromagnetic sensor systems shows that for polarised or partially polarised transmitted pulses, the target signatures have co-polar and cross-polar components which are dependent on the target orientation. Thus, the measured signature depends on the alignment of the transmit and receive antennas and on the target orientation. Fortunately, the dynamics of the target and the relatively short distance between the different receive antennas used by the apparatus mean that target orientation cannot change significantly in the time between detections at different antenna sites.

However, it is clear from this discussion that the ideal situation envisaged above can only be realised if the receive antennas are mounted on the vehicle equipped with the apparatus in such a manner that their sensitivity is identical for all polarizations. For example, the antennas could be identical, oriented parallel and both mounted on a flat ground plate.

This would be impossible on many potential targets as the antenna and ground plane orientation are determined by the curvature of the body.

(b) Processing to mitigate the polarization problem

As discussed above, the target signature as measured by two different receive antennas will be different, and it will therefore not be possible to make a meaningful differential time measurement using only two antennas. However, if the antennas have a linear polarization response (that is, the response to a unipolar signal varies as cos (θ) where θ is the angle between the plane of polarization and the antenna axis of sensitivity), then the signature measured at each antenna will be given by:

$$y_i(t)=a_i s_1(t+\delta t_i)+b_i s_2(t+\delta t_i)+n_i(t) \qquad (13)$$

where $s_1(t)$ and $s_2(t)$ are the two independent polarization components of the reflected target signature, $a_i$ and $b_i$ are the corresponding coupling coefficients for each individual antenna, $\delta t_i$ is the antenna time delay, and $n_i(t)$ is the noise, which for the purposes of the present discussion is assumed independent in each receiver channel.

If three or more antennas are used, then the non-linear system of equations (13) for the set of antennas is over constrained and can be solved for the $\delta t_i$. Note that there is some redundancy in the system associated with the arbitrary choice of time origin and polarization axes. This redundancy can be removed by setting $\delta t_1=0$, $a_1=1$, $b_1=0$.

One direct algorithm for solving this problem when evaluating the differential delay by the correlation process described above is to form the correlation of $y_1$ with the other $y_i$ and form the residual after subtracting the correlated part. The resulting signal with the greatest amplitude is then an estimate of the linearly independent component of $s_2(t)$, appropriately delayed. A simple search in time can then be done to find the channel delays which give the smallest residual error after the fitting to a linear combination of $s_1$ and $s_2$.

In summary, the preferred embodiments of the present invention are based on improvements to the electronics and processing algorithm to enable the three dimensional position of the target to be measured at a sequence of times so that the motion of the target can be unconstrained. This enables there to be provided three dimensional position measurement of similar accuracy to that achievable with the prior art apparatus from very small vehicles (in particular antenna separations of less than 1 m) at reduced cost. The particular apparatus has other operational advantages such as there being a great reduction in the volume of data that the sensor produces to be processed. Where the data is radio-linked to a ground station this yields the advantage of limiting the required telemetry bandwidth.

It will be understood that the present invention has been described above purely by way of example, and modifications of detail can be made within the scope of the invention.

Each feature disclosed in the description, and (where appropriate) the claims and drawings may be provided independently or in any combination.

What is claimed is:

1. Apparatus for determining positional information for an object, said apparatus comprising:
    means for transmitting a probe signal towards the object;
    means for receiving, at a plurality of spaced apart locations, the probe signal as returned by the object; and
    detecting means coupled to the receiving means for detecting a relative timing of the returned probe signals as received at the plurality of locations, said relative timing being a timing of the returned probe signal as received at at least one of said plurality of locations relative to a timing of the returned probe signal as received at at least one other of said plurality of locations;
    whereby the positional information for the object can be determined from said relative timing.

2. Apparatus according to claim 1 including means for determining the positional information for the object from said relative timing.

3. Apparatus according to claim 2 wherein the determining means determines an angular position of the object.

4. Apparatus according to claim 2 wherein the determining means determines the positional information by triangulation.

5. Apparatus according to claim 4 wherein the determining means determines a trajectory for the object by triangulating at a plurality of discrete times.

6. Apparatus according to claim 1 wherein the detecting means determines the returned signals at a given minimum range from the apparatus, an angle mutually subtended by the locations at that minimum range being less than one of 10, 5, and 3 degrees.

7. Apparatus according to claim 1 wherein the detecting means detects the relative timing of the returned signals by cross correlating between them.

8. Apparatus according to claim 1 wherein the probe signal comprises a pulse of a given duration, and the detecting means detects the relative timing of returned signals which are received within a period of one of twice, once and one half said given duration.

9. Apparatus according to claim 1 wherein the detecting means detect the relative timing of returned signals which are received within one of 3, 2 and 1 ns and 500, 250 and 100 ps of each other.

10. Apparatus according to claim 1 wherein the detecting means detects the relative timing of return probe signals which are received substantially simultaneously.

11. Apparatus according to claim 1 wherein the detecting and receiving means provide uncertainty in said relative timing that is less than one of 100, 50, 20, 10 and 5 ps.

12. Apparatus according to claim 1 wherein the receiving means includes means for limiting a power of the probe signal as received.

13. A method of determining positional information for an object, said method comprising:
    transmitting a probe signal towards the object;
    receiving, at a plurality of spaced apart locations, the probe signal as returned by the object; and
    detecting a relative timing of the returned probe signals as received at the plurality of locations, said relative timing being a timing of the returned probe signal as received at at least one of said plurality of locations relative to a timing of the returned probe signal as received at at least one other of said plurality of locations;
    whereby the positional information for the object can be determined from said relative timing.

14. A method according to claim 13 including a step of determining the positional information for the object from said relative timing.

15. A method according to claim 13 wherein an angular position of the object is determined.

16. A method according to claim 14 wherein the positional information is determined by triangulation.

17. A method according to claim 16 wherein a trajectory for the object is determined by triangulating at a plurality of discrete times.

18. A method according to claim 13 wherein the probe signal comprises a pulse of given duration, and the relative timing is detected of returned signals which are received within a period of one of twice, once and one half said given duration.

19. A method according to claim 13 wherein the relative timing is detected of returned signals which are received within one of 3, 2 and 1 ns and 500, 250 and 100 ps of each other.

20. A method according to claim 13 wherein the relative timing is detected of returned probe signals which are received substantially simultaneously.

21. A method according to claim 13 wherein an uncertainty in said relative timing is less than one of 100, 50, 20, 10 and 5 ps.

22. A method according to claim 13 wherein the returned signals are only detected at given range gates, and a gate separation is greater than one of 1, 1.2, 1.5, and 1.7 times a maximum dimension of the object taken in a direction towards any of said spaced apart locations.

23. Apparatus according to claim 1 further comprising means for generating a detection timing signal at a delay after a given probe signal transmission time, corresponding to at least one selected range for the object; and wherein the detecting means comprises a plurality of detectors, each one for detecting the returned probe signal as received at a respective one of the locations in response to a common detection timing signal.

24. Apparatus for determining positional information for an object, comprising:
    means for transmitting, at a given transmission time, a probe signal towards the object;
    means for generating a detection timing signal at a delay after the transmission time, corresponding to at least one scheduled range for the object;
    means for receiving, at a plurality of spaced apart locations, the probe signal as returned by the object; and
    detecting means coupled to the receiving means and comprising a plurality of detectors, each one for detecting the return probe signal as received at a respective one of the locations in response to a common detection timing signal;
    whereby the positional information for the object can be determined from outputs of the detectors.

25. Apparatus according to claim 24 wherein the generating means comprises a pulse generator, a single such generator being used to generate the common timing signal.

26. Apparatus according to claim 24 wherein the detecting means comprises a plurality of sets of detectors and the generating means generates a plurality of common detection timing signals, a respective one for each set of detectors.

27. Apparatus according to claim 24 wherein no more than two detectors are provided for detecting the returned probe signal as received at any one of the locations.

28. Apparatus according to claim 24 wherein each detector has at least one output, and including means for distinguishing from said outputs of the detectors information concerning different ranges.

29. Apparatus according to claim 24 wherein the generating means generates different kinds of detection timing signals.

30. A method according to claim 13 further comprising generating a detection timing signal at a delay after a given probe signal transmission time, corresponding to at least one selected range for the object; and providing a plurality of detectors, each one detecting the return probe signal as received at a respected one of the locations in response to a common detection timing signal.

31. A method of determining positional information for an object, comprising the steps of:
   transmitting, at a given transmission time, a probe signal towards the object;
   generating a detection timing signal at a delay after the transmission time, corresponding to at least one selected range for the object;
   providing a plurality of detectors, each one detecting the returned probe signal as received at a respective one of the locations in response to a common detection timing signal;
   whereby the positional information for the object can be determined from outputs of the detectors.

32. A method according to claim 31 wherein in said step of generating a detection timing signal a pulse generator is provided, a single such generator generating the common timing signal.

33. A method according to claim 31 wherein a plurality of sets of detectors is provided and a plurality of common detection timing signals is generated, a respective one for each set of detectors.

34. A method according to claim 31 wherein in said step of transmitting a probe signal pulsed probe signals are transmitted at a selected pulse repetition frequency, a measure of the inverse of said frequency defining a pulse repetition frequency path length for the signals; and in said step of detecting the returned probe signal a path length for the signals greater than which the object cannot be detected defines a maximum detectible path length; the pulse repetition frequency being selected such that the pulse repetition frequency path length is less than the maximum path length.

35. A method of determining positional information for an object, comprising:
   transmitting pulsed probe signals towards the object at a selected pulse repetition frequency, a measure of the inverse of said frequency defining a pulse repetition frequency path length for the signals;
   receiving the probe signals as returned by the object; and
   detecting the returned probe signals, a path length for the signals greater than which the object cannot be detected defining a maximum detectible path length;
   the pulse repetition frequency being selected such that the pulse repetition frequency path length is less than the maximum path length; and
   whereby the positional information for the object can be determined from the returned probe signal.

36. A method according to claim 35 wherein the maximum path length is greater than one of twice, three, four and five times the pulse repetition frequency path length.

37. A method according to claim 35 wherein the pulse repetition frequency path length is greater that one of two three and four times the maximum dimension of the object taken in a direction towards any of said spaced apart locations.

38. A method according to claim 35 wherein the returned signals are detected at a given sampling frequency.

39. A method according to claim 38 wherein one of the pulse repetition frequency and the sampling frequency is an integral multiple of the other.

40. A method according to claim 35 wherein probe signals of different relative amplitudes are transmitted.

41. A method according to claim 35 wherein the probe signals are detected at a plurality of distinct range gates, using a number of detectors which is less than the number of range gates.

42. A method according to claim 35 wherein the probe signals are all of the same amplitude.

43. A method according to claim 35 wherein the returned signals are detected at a plurality of distinct range gates, using a number of detectors which is less than the number of range gates.

44. Apparatus for determining the position of an object with respect to plural detectors, said apparatus comprising:
   at least one signal transmitter connected to a signal radiator directed toward said object;
   a plurality of signal detectors, each connected to a respective one of plural signal receivers disposed at respective predetermined spaced apart locations and directed to receive transmitted signals returned from said object; and
   at least one elapsed time detector connected to said plural signal detectors and measuring relative differences in time between reception of similar returned signals by said plural spaced apart signal detectors.

45. Apparatus as in claim 44 further comprising:
   a position calculator connected to said at least one elapsed time detector to receive said measured relative differences in returned signal detection times and calculate therefrom the position of said object with respect to said detectors.

46. A method according to claim 13, wherein in said step of transmitting a probe signal pulsed probe signals are transmitted at a selected pulse repetition frequency, a measure of the inverse of said frequency defining a pulse repetition frequency path length for the signals; and in said step of detecting the returned probe signal a path length for the signals greater than which the object cannot be detected defines a maximum detectible path length; the pulse repetition frequency being selected such that the pulse repetition frequency path length is less than the maximum path length.

47. Apparatus according to claim 1, wherein the probe signal comprises a plurality of pulsed signals.

48. A method according to claim 13, wherein the probe signal comprises a plurality of pulsed signals.

49. Apparatus according to claim 24, wherein the probe signal comprises a plurality of pulsed signals.

50. A method according to claim 31, wherein the probe signal comprises a plurality of pulsed signals.

51. Apparatus for determining positional information for an object, said apparatus comprising:
   means for transmitting, at a given transmission time, a probe signal towards the object;
   means for generating a detection timing signal at a delay after the transmission time, corresponding to at least one selected range for the object;

means for receiving, at a plurality of spaced apart locations, the probe signal as returned by the object; and detecting means coupled to the retrieving means and comprising a plurality of detectors, each one for detecting, during a period of time corresponding to a measure of a range gate for each receiver, the returned probe signal as received at a respective one of the locations in response to a common detection timing signal.

52. Apparatus as in claim 51 wherein the generating means comprises a pulse generator for generating a pulse which defines said range gate.

53. Apparatus as in claim 51 further comprising means for determining positional information for the object from said outputs.

54. Apparatus as in claim 51, which does not employ a Doppler technique to determine said positional information.

55. Apparatus as in claim 24, further comprising means for determining positional information for the object from said outputs of said detectors and said delay.

56. A method of determining positional information for an object, said method comprising:

transmitting, at a given transmission time, a probe signal towards the object;

generating a detection timing signal at a delay after the transmission time, corresponding to at least one selected range for the object;

receiving, at a plurality of spaced apart locations, the probe signal as returned by the object; and providing a plurality of detectors, each one detecting, during a period of time corresponding to a measure of a range gate for each receiver, the returned probe signal as received at a respective one of the locations in response to a common detection timing signal;

whereby positional information for the object can be determined from the outputs of the detectors.

57. A method as in claim 56 including determining positional information for the object from said outputs.

58. Apparatus as in claim 56 wherein said positional information is not determined by a Doppler technique.

59. A method as in claim 31 including determining positional information for the object from said outputs.

60. Apparatus for determining positional information for an object, said apparatus comprising:

at least one probe signal transmitter connected to a probe signal radiator directed towards said object and transmitting, at a given transmission time, a probe signal towards the object;

at least one delay circuit connected to provide a detection timing signal at a delay after the transmission time, corresponding to at least one selected range for the object;

a plurality of spaced apart probe signal receivers connected to receive probe signals at respective spaced-apart locations as returned by the object; and a plurality of detectors, each connected with a respective receiver and detecting the returned probe signal as received at a respective one of the receiver locations in response to a common detection timing signal.

* * * * *